(12) United States Patent
Schiff et al.

(10) Patent No.: US 7,920,543 B2
(45) Date of Patent: Apr. 5, 2011

(54) WIRELESS BROADBAND COMMUNICATIONS NETWORK USING MESSAGE DIFFUSION ARCHITECTURE

(75) Inventors: Leonard N. Schiff, San Diego, CA (US);
David S. Miller, Narrow Neck (NZ);
Sumantra Chakravarty, W Lafayette, IN (US)

(73) Assignee: Qualcomm Incorporated, San Diego, CA (US)

( * ) Notice: Subject to any disclaimer, the term of this patent is extended or adjusted under 35 U.S.C. 154(b) by 908 days.

(21) Appl. No.: 11/620,630

(22) Filed: Jan. 5, 2007

(65) Prior Publication Data
US 2007/0232310 A1    Oct. 4, 2007

Related U.S. Application Data

(60) Provisional application No. 60/759,722, filed on Jan. 18, 2006.

(51) Int. Cl.
*H04J 3/24* (2006.01)
(52) U.S. Cl. ....... 370/349; 370/338; 455/41.1; 455/41.2
(58) Field of Classification Search ............... 455/7, 16, 455/507, 517, 11.1–13.3, 41.1, 41.2, 63.4; 370/349, 242–246, 253, 315–326, 328–330, 370/335–338
See application file for complete search history.

(56) References Cited

U.S. PATENT DOCUMENTS

| | | | |
|---|---|---|---|
| 5,706,428 A * | 1/1998 | Boer et al. | 370/342 |
| 6,215,793 B1 * | 4/2001 | Gultekin et al. | 370/465 |
| 7,107,498 B1 * | 9/2006 | Schmidt et al. | 714/704 |
| 7,302,227 B2 * | 11/2007 | Sakoda | 455/41.2 |
| 2002/0075940 A1 * | 6/2002 | Haartsen | 375/132 |
| 2003/0033394 A1 * | 2/2003 | Stine | 709/222 |
| 2003/0103521 A1 | 6/2003 | Raphaeli et al. | |

(Continued)

FOREIGN PATENT DOCUMENTS

EP    1324509 A    7/2003

(Continued)

OTHER PUBLICATIONS

T. Joshi, et al., "Route Recovery Mechanisms for Ad Hoc Networks Equipped with Switched Single Beam Antennas" Simulation Symposium, 2005. Proceedings. 38th Annual San Diego, CA, USA Apr. 4-6, 2005, Piscataway, NJ, USA, IEEE, Apr. 4, 2005, pp. 41-48.

(Continued)

*Primary Examiner* — Jinsong Hu
*Assistant Examiner* — Michael Nguyen
(74) *Attorney, Agent, or Firm* — Turocy & Watson, LLP

(57) ABSTRACT

A broadband terrestrial message delivery system includes a plurality of wireless communication devices (WCDs), each including a receiver and transmitter, the WCDs capable of not only receiving messages destined for a subscriber associated with a particular WCD, but further capable of acting as a relay point to move messages to and from other subscribers. Message diffusion includes relaying the messages in accordance with all earmark that specifies both the total number of times (N) a message is to be repeated, and the number of times (i) the received message has already been repeated. Methods of improving the spectral efficiency of such a message diffusion architecture include adding a propagation ring width control parameter (J) to the earmark such that a WCD acting in relay mode transmits no more than J repetitions of the message; and providing sectorization such that several sectorized message pathways in a cell may be simultaneously active.

43 Claims, 12 Drawing Sheets

U.S. PATENT DOCUMENTS

| | | | |
|---|---|---|---|
| 2003/0125067 A1* | 7/2003 | Takeda et al. | 455/522 |
| 2003/0152086 A1 | 8/2003 | Batt et al. | |
| 2004/0162022 A1* | 8/2004 | Lahetkangas et al. | 455/41.1 |
| 2005/0058151 A1 | 3/2005 | Yeh | |
| 2005/0097386 A1* | 5/2005 | Datta et al. | 714/4 |
| 2006/0209878 A1* | 9/2006 | Nelson | 370/458 |
| 2006/0286984 A1* | 12/2006 | Bonner | 455/445 |

FOREIGN PATENT DOCUMENTS

| | | | |
|---|---|---|---|
| WO | WO 2004/071020 | * | 8/2004 |

OTHER PUBLICATIONS

Wang Lan, et al., "A Two-Zone Hybrid Routing Protocol for Mobile Ad Hoc Networks" Dec. 2004, IEEE Transactions on Parallel and Distributed Systems, IEEE Service Center, Los Alamitos, CA, US, pp. 1105-1116.

International Search Report mailed May 16, 2007 for PCT Application Serial No. PCT/US2007/060714, 3 pages.

* cited by examiner

WIRELESS BROADBAND COMMUNICATIONS NETWORK USING MESSAGE DIFFUSION ARCHITECTURE

CROSS-REFERENCE TO RELATED APPLICATION

The present application claims the benefit of U.S. Provisional Patent Application No. 60/759,722, filed Jan. 18, 2006. This provisional patent application is incorporated herein by reference in its entirety.

BACKGROUND OF THE INVENTION

1. Field of the Invention

The present invention relates generally to wireless communication systems and more particularly to methods and apparatus for providing wireless broadband communications services.

2. Background

Many forms of electronic communication, including both wired and wireless, have been developed over the years. Wireless communication systems have included both terrestrial-only systems with transmitters and receivers on the ground, as well as satellite communications systems that integrate a space-based component with terrestrial transmitters and receivers.

One form of electronic communication that has become very widely used in recent times is the Internet. The introduction of the World Wide Web, by which rich content is readily available to users through a graphical interface, made using the Internet attractive to millions of people. Software applications running on the computers of individual users have typically accessed the Internet via telephone modems. Unfortunately, the data rates available via conventional modems which communicate via traditional phone lines, limit the amount of data users can practically upload and download.

Some alternatives to data communication over conventional phone line circuits have been introduced in recent years. For example, various broadband protocols implemented through Digital Subscriber Line (DSL) modems, cable modems and fiberoptic modems, offer higher data rates than are achievable with analog modems. There are drawbacks with each of these approaches, including, for example, physical wiring between a service provider and an individual user's equipment or premises. Additionally, landline based broadband services require that phone companies or other providers install new equipment, and the service is not readily available everywhere. For similar reasons, the ability to recover costs is especially difficult in less densely populated areas.

In view of the wide use of the Internet and World Wide Web by individual consumers, an important consideration in the development and deployment of a system for satisfying those consumer requirements is cost. In other words, unlike various government or commercial-only systems, new equipment and services for the consumer marketplace need to comply with much greater cost constraints.

What is needed are cost-effective methods and apparatus for providing wireless broadband terrestrial information delivery.

Wireless communication devices (WCDs) are becoming increasingly commonplace. For example, millions (if not billions) of individuals own and/or utilize one or more WCDs such as, but not limited to, a mobile phone, personal data assistants (PDA), a wireless gaming device and a computer with wireless capabilities. To support the growing numbers of WCDs, there are also many numbers of service providers, and the user typically subscribes or is granted access these services. Wireless communication systems are widely deployed to provide various types of communication such as voice and data. A typical wireless data system, or network, provides multiple users access to one or more shared resources. A system may use a variety of multiple access techniques such as frequency division multiplexing (FDM), time division multiplexing (TDM), code division multiplexing (CDM), and others. Examples of wireless networks include cellular-based data systems. The following are several such examples: (1) the "TIA/EIA-95-B Mobile Station Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

SUMMARY OF THE INVENTION

In one aspect, a communication method is used for iteratively relaying a communication signal. A sector location of the communication signal is determined. The communication signal is transmitted in a wide spectrum format signal format which allows reception of signals with multiple time delays. The signal is iteratively relayed, and in the case of the sector location at a central region, communication is maintained so as to diffuse blindly. In a particular aspect, the communication signal is provided as an orthogonal frequency division multiplex (OFDM) signal as the communication signal.

In a particular aspect, an iteratively relayed communication signal is provided as an OFDM signal. The OFDM signal provides a semi-blind diffusion protocol, so that a sector reduces inter-sector interference by using a central region in which messages diffuse blindly, and in which nodes at, or near, sector boundaries route messages destined for a node near an edge of the sector. This forms quiet zones near the edge of the sector, and permits adding and deleting nodes at, or near, the sector boundaries in accordance with a detected message error rate.

In a particular aspect, a communication technique includes determining a sector location of a communication signal in accordance with a signal interzone diffusion level, and iteratively relaying the communication signal and in the case of the sector location at a central region, maintaining communication in which communication diffuses blindly. This technique may include monitoring a signal error rate at each of several nodes, and adding and deleting nodes accordingly. In blind diffusion, a receiver receiving a message for the first time is receiving the superposition of signals from many transmitters, all of which received the message at an earlier time (last iteration or earlier).

In another aspect, a sector location and a signal interzone diffusion level of a communication signal may be determined. In the case of the sector location at a central region, communication is diffused blindly, and zone-based routine is applied for sector locations near a sector boundary. In the case of the sector location at a central region, the communication diffuses blindly.

In another aspect, an iteration count may be applied, which includes:

(a) receiving, at the WCD, a message including an iteration count (i), an iteration limit (J), a network iteration limit, a destination address, and a content portion;

(b) processing the message within the WCD if the destination address matches an address for that WCD;

(c) setting a temporary variable equal to the value of J;

(d) determining whether the iteration count reached an iteration limit, and if not, then modifying the temporary variable to indicate an iteration change;

(e) determining whether the message reached an iteration limit, and modifying i to indicate that one more iteration has been performed; and (f) transmitting a message that includes the modified i, J, N, the destination address, and the content portion.

The steps of iteration are repeated until the iteration limit is reached.

In a further aspect, greater spectral efficiency in a message diffusion architecture is obtained by modifying message diffusion such that a message propagates as an annulus of expanding radius.

In a still further aspect, improvements in spectral efficiency are obtained by sectorizing message flow within a cell.

BRIEF DESCRIPTION OF THE DRAWINGS

The features objects, and advantages of the present invention will become more apparent from the detailed description set forth below when taken in conjunction with the drawings in which like reference characters identify the same or similar elements throughout and wherein.

DETAILED DESCRIPTION

Figure 1:
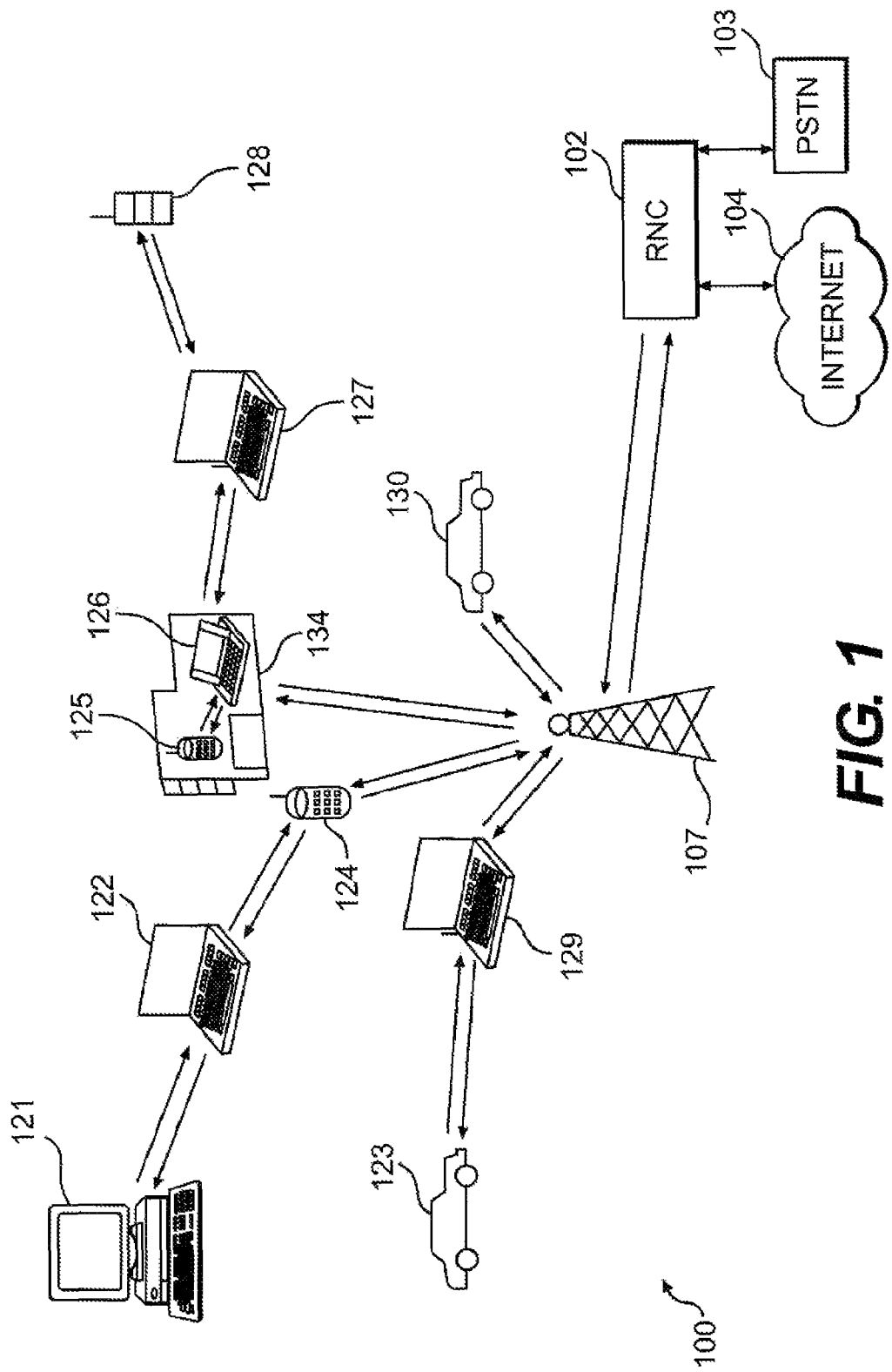
FIG. 1 is a diagram illustrating an example of a wireless communication network.

Various illustrative configurations are discussed in detail below. While specific steps, configurations, and an arrangements are discussed, it should be understood that this is done for illustrative purposes only. A person skilled in the relevant art will recognize that other steps, configurations, and arrangements can be used without departing from the spirit and scope of the present invention.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Various attributes are believed to be important for a commercially successful wireless broadband service to the home. For example, such a wireless broadband service should work in both urban and suburban areas; should use low-power customer units (e.g., $\leq 1$ watt); should use a simple antenna that is omnidirectional in the azimuthal plane; the antenna should be easy for a customer to install outside a window; and the connection between the customer unit and various indoor devices should be conveniently made by a suitable wireless (WLAN) or local area network.

Generally, wireless broadband terrestrial message delivery to the home is provided in an economical fashion, by way of using a number of relatively low-cost, low-power transmitters to propagate a message from a source to a destination. Such a wireless broadband system may be implemented in, for example, the mm wave band. Costs tend to be low compared to conventional approaches due, at least in part, to use of a transmitter on a subscriber's wireless communication device (WCD) which is a low-power transmitter, and the use of an easy-to-install (i.e., self-installed by subscriber) omnidirectional antenna, which does not require pointing.

Each of a plurality of subscribers for a wireless broadband service has a WCD that includes an antenna, a receiver, and a transmitter. In some configurations, the WCD also includes computational resources for making various determinations, which are described in greater detail. The receiver allows the subscriber to receive messages for which the subscriber is the intended recipient. Such messages typically include content, as well as control information. The receiver also receives messages that are intended for other subscribers. In this situation, the WCD transmits the message via its low-power transmitter. In this way, a message "diffuses" throughout an area in which WCDs exist, such that the message may reach the intended WCD.

Overview

Wireless broadband terrestrial delivery of information is achieved by way of a message diffusion architecture. A broadband terrestrial message delivery system includes a plurality of wireless communication devices (WCDs) each WCD including a receiver and transmitter, the WCDs capable of not only receiving messages destined for a particular WCD or communication device, but further capable of acting as a relay point to move messages to and from other subscribers. Message diffusion includes relaying the messages in accordance with an earmark that specifies both the total number of times (N) a message is to be repeated, and the number of times (i) the received message has already been repeated. Methods of improving the spectral efficiency of such a message diffusion architecture include adding a propagation ring width control parameter (J) to the earmark such that a WCD acting in relay mode transmits no more than J repetitions of the message; and providing sectorization such that several sectorized message pathways in a cell may be simultaneously active.

The Wireless Environment

FIG. 1 is a diagram illustrating an example of a wireless communication network (hereinafter "network") 100 using one or more radio network controllers (RNCs) 102, or local control stations such as base stations controllers (BSC) or Node Bs. The RNC 102 connects the wireless network 100 with a public switched telephone network (PTSN) 103 and the internet 104, although it is understood that multiple connections to the PTSN and internet can be made.

One or more base stations (BS) or access points 107, sometimes referred to as base station transceivers systems, are connected to the RNC 102. It is also contemplated that one or more access points may operate independently of the RNC 102 to effect connection with the internet or the PTSN. A plurality of WCDs 121, 122, 123, 124, 125, 126, 127, 128, 129, 130 are in communication either with each other or with access point 107.

As depicted, some of the WCDs 124, 126, 129, 130 are in direct communication with access point 107. Other ones of the WCDs 121-130 are to varying extent out of range of access point 107, but are within range for direct transmission and reception communication with at least one other WCD 121-130. The limitation of range may be distance, as depicted for WCDs 121, 122, 123 or as a result of other factors, such as building enclosure 134, affecting WCD 125.

In order to extend the network so as to include all of WCDs 121-130, communications are relayed. This permits WCDs, such as WCDs 121, 122 that are not within direct communication range with access point 107 to communicate through WCDs such as WCD 124 that are within direct communication range access point 107.

Wireless Communication Devices

Figure 2:
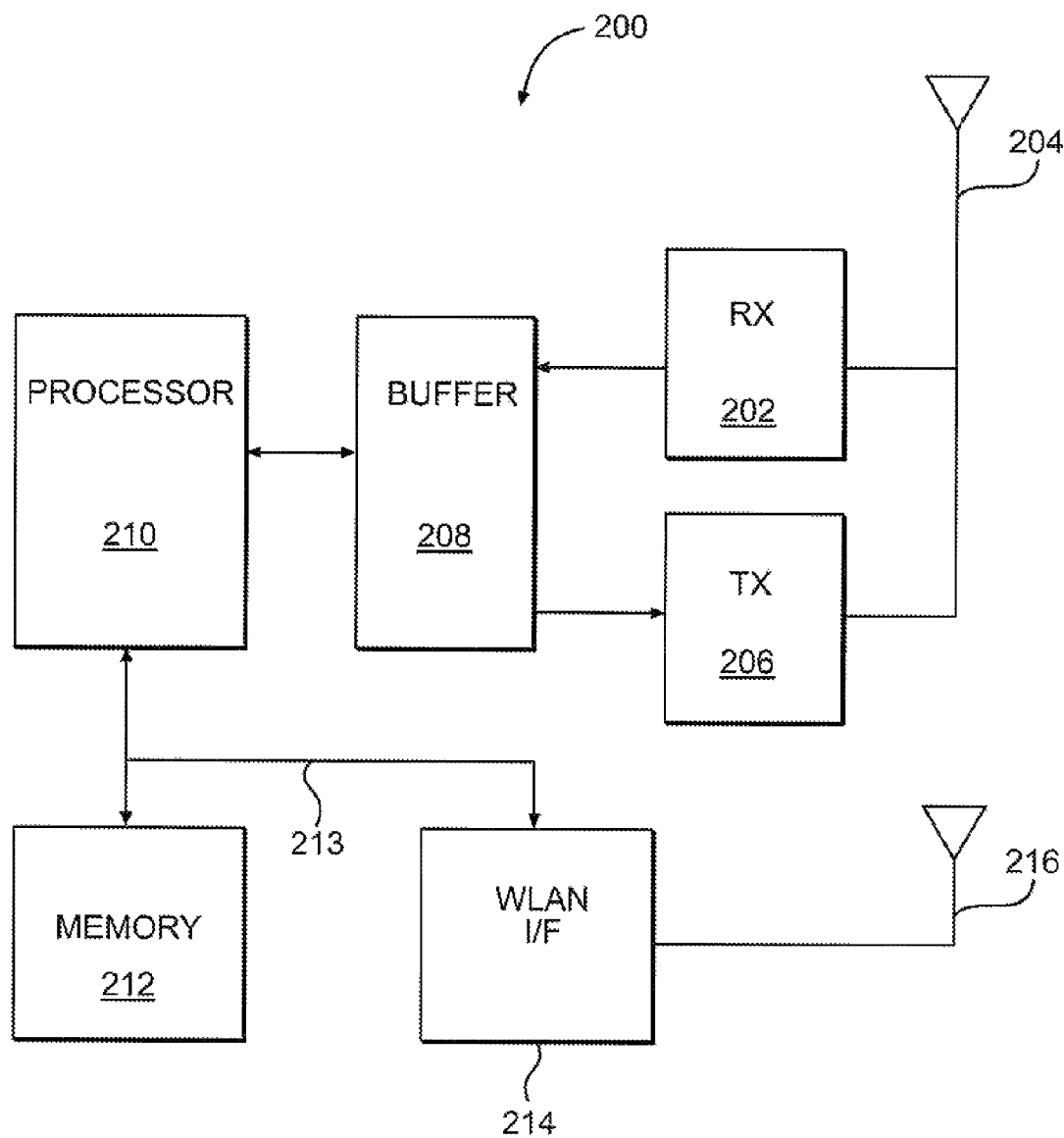
FIG. 2 is a schematic block diagram of a WCD in accordance with the present invention.

FIG. 2 is a schematic block diagram of a WCD 200 in accordance with the present invention. More particularly, a receiver 202 adapted to receive message transmissions is coupled to antenna 204. In this illustrative configuration, receiver 202 is constructed so as to receive signals in a pass band large enough to accommodate multiple channels that have been transmitted by transmitters using an orthogonal frequency division multiplexing (OFDM) modulation scheme. One advantage of using an OFDM receiver in the example configurations is that it can simultaneously receive signals from multiple transmitters (all transmitting the same signal) and do this without having to know that there are multiple transmitters and the respective delays thereof.

A multi-tone frequency division multiplex (FDM) system, meaning a system using multiple tones for communication, has a property of robust handling of multipath signals and multiple signals. This is because the receiver can receive the message with multiple time delays. The more signals it receives, the better the result will be, so long as the longest differential delay is not too delayed or too strong. Multiple time delays may originate from multipath signal propagation, and from multiple transmitters. In either case, multiple signals are liable to arrive at different times. Further, unlike ordinary CDMA which can also get some gain out of multipath signals, multiple tone signal reception takes no special processing (e.g., a RAKE receiver circuit) to obtain the increase in gain. OFDM is particularly spectrally efficient, and therefore has advantages. Thus OFDM provides communication signals in a wide spectrum format, and is able to accommodate multiple channels over a shared frequency band.

Antenna 204 is an omnidirectional antenna. A transmitter 206 is also coupled to antenna 204. Both receiver 202 and transmitter 206 are coupled to buffer memory 208. In this illustrative configuration, information received from receiver 202 may be stored in buffer memory 208, and information queued for transmission may be provided to transmitter 206. In other words, receiver 202 retrieves information from an RF signal and delivers baseband data to buffer memory 208, while baseband data may be accessed by transmitter 206 where it is modulated and upconverted to the RF output signal. Buffer memory 208 is further coupled to a processor 210. Processor 210 may be any suitable computational resource, such as, but not limited to, commercially available microcontrollers and microprocessors. Processor 210, is coupled to a memory 212, which is suitable for storing both instructions and data that can be used by processor 210 in executing a stored program. Under control of at least the program instructions in memory 212, processor 210 may provide one or more control signals (such as by way of control bus 213), or place control data in buffer memory 208 or memory 212 by which operation of receiver 202, transmitter 206 and/or a wireless local area network (WLAN) interface 214, may be affected. WLAN interface 214 may be used to provide a communications path between WCD 200, and one or more other electronic devices in a home, or other setting in some example configurations, buffer memory 208 and memory 212 may be effectively integrated into a unified addressable memory.

In the illustrative configuration of FIG. 2, it is noted that the channel bandwidth of receiver 202 may be divided into hundreds or thousands of orthogonal "micro-channels". Typically, a high speed serial input stream is encoded, and the encoded stream is serial-to-parallel converted. Parallel stream symbols modulate each micro-channel. Such modulation may include, but is not limited to, binary phase-shift keying (BPSK), quadrature phase-shift keying (QPSK), and quadrature amplitude modulation (QAM), depending on the signal to noise ratio. An inverse fast. Fourier transform (IFFT) may be used to convert parallel stream symbols to a time waveform. The relationship between the frequencies of the micro-channels assures that the micro-channels are orthogonal, and therefore complicated filters or large guardbands are not required to separate the micro-channels. Forward error correction (FEC) typically operates over all the micro-channels.

In one example configuration, a sufficient number of micro-channels is used such that the symbol time on the micro-channel is much larger than the largest multipath delay. Further, at the beginning of the transmission of symbol, there is a guard time before receiver 202 at WCD 200 collects samples (i.e., a first portion of the symbol is ignored to allow multipath reverberations to become insignificant). Such a guard time may be about 10% of the symbol time. In any case, the guard time is long enough so that all, or substantially all, of the multi-path reverberations have ceased and the micro-channel is in steady state. In view of the above, no equalizer is required.

Operation of a WCD to Relay Communications

In a system that includes a plurality of WCDs 200, receivers 202 may receive signals from a plurality of transmitters 206. Generally, it is noted, multipath interference creates a large variation of signal strength versus frequency across the spectral band. However, the signal strength variation, due to multipath, across any particular micro-channel must be small. In other words, the multipath delay is small compared to the symbol time duration of that micro-channel. Additional transmitters 206 may be added to the system. The transmissions of those transmitters can be seen as the equivalent of adding new sources of strong multipath. As long as the micro-channel symbol time is longer than the longest multipath (considering all transmitters using this particular micro-channel) the effect is to increase the expected signal to noise ratio on the micro-channel. In the example noted above wherein the guard time is about 10% of the symbol time, the symbol time is longer than the longest multipath by about ten-to-one. A benefit of this arrangement is that the increased signal to noise ratio allows a higher data rate modulation scheme to be employed (for example moving from BPSK to QPSK, or QPSK to QAM).

The techniques described here can be used with a wide variety of communication systems. The techniques are advantageous when used with frequency division multiplex (FDM) systems and orthogonal frequency division multiplex (OFDM) systems. The techniques find particular advantage in OFDM communications, in part because cross-talk between sub-channels is eliminated and inter-carrier guard bands are not required.

Figure 3:
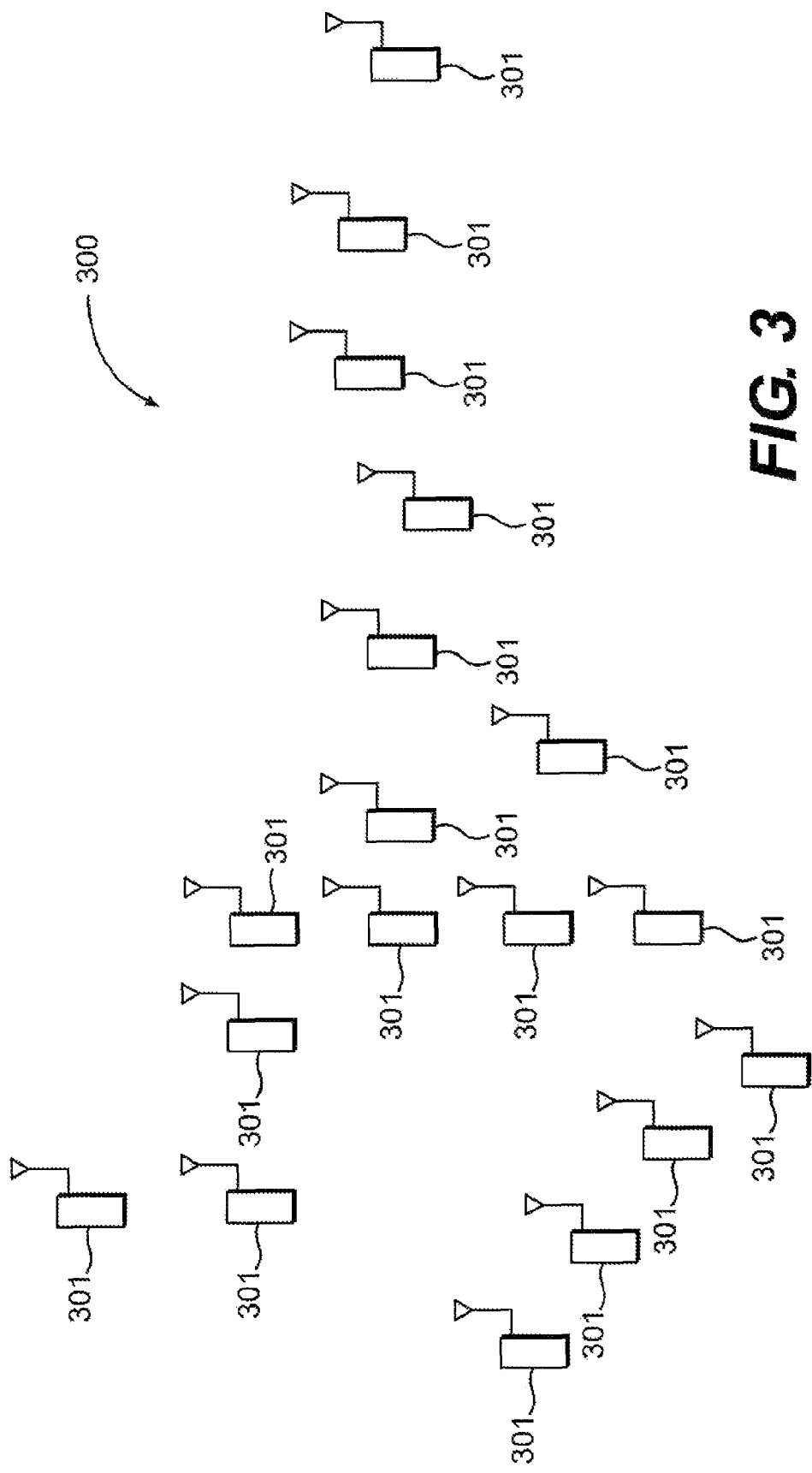
FIG. 3 is a schematic representation of a neighborhood WCDs.

FIG. 3 is a schematic representation of a neighborhood 300 of WCDs 301. As illustrated in the figure, an example system in accordance with the present invention includes a plurality of WCDs 301 which are typically installed in homes. The delivery of information, or content, from a source to a destination includes propagation of messages by diffusion. Message diffusion is achieved by a process in which a message is broadcast from a low-power transmitter of a first WCD, and wherein that message is received and relayed by additional WCDs 301 until the message has propagated to its intended destination receiver. Relaying of a message is sometimes referred to herein as an iteration. When a neighborhood, or any particular geographical region, has a distribution of WCDs sufficient to pass a message from source to destination by diffusion, this approach to delivery of wireless broadband services may be used.

The WCD, or any other system, which is the original source of the information to be delivered by message diffusion may be referred to herein as a message originator. In some instances, a base station may be the message originator. A base station may differ from a WCD in various aspects such as antenna configuration, transmit power, network control functionality, and so on. In some instances a base station may provide connection to one or more content sources. The connection to the one or more content sources may be wired, wireless, or a combination thereof. Content sources may include, but are not limited to, television programming sources, or a connection to the Internet.

Figure 4:
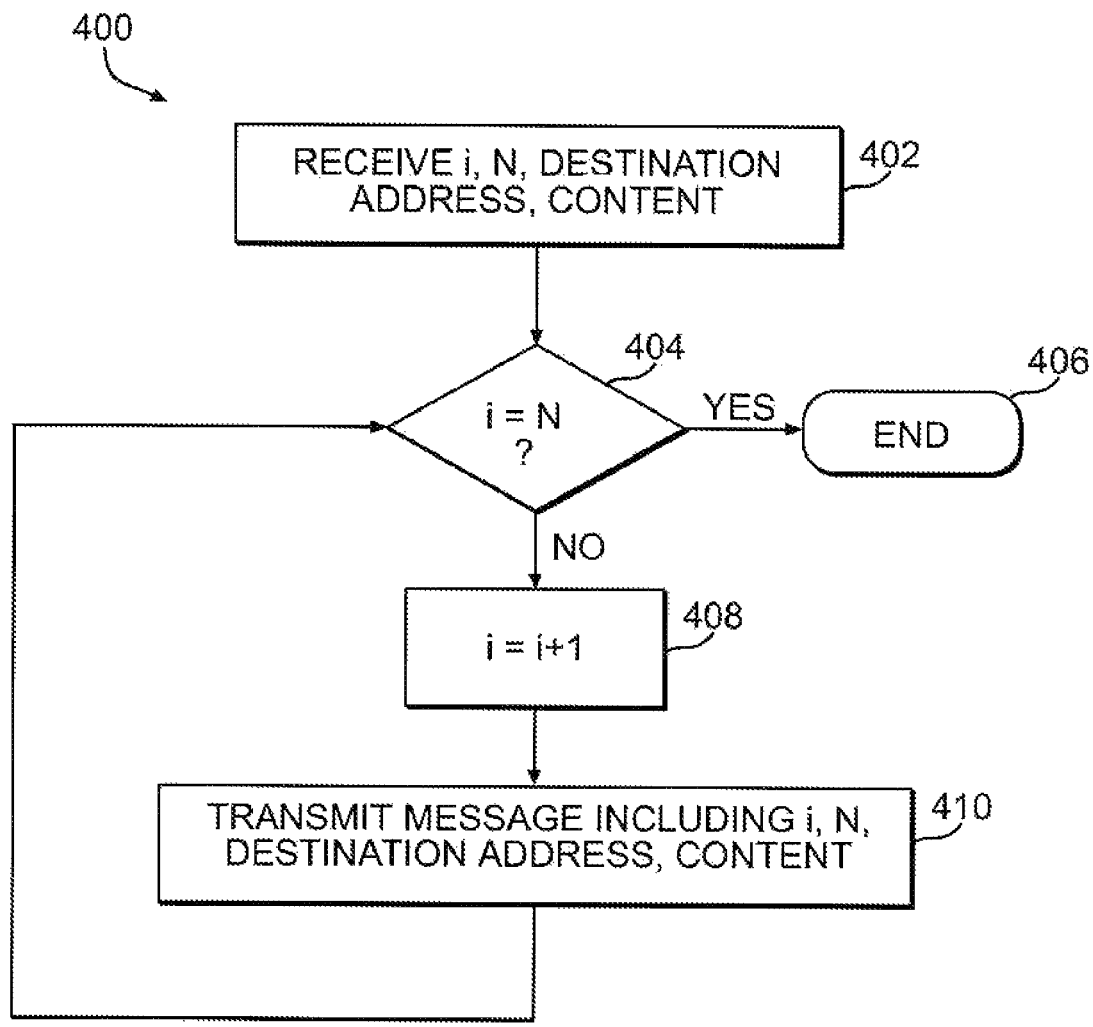
FIG. 4 is a flowchart of an illustrative process, in accordance with the present invention, that receives a message including an earmark, and relays the content of the message one or more times depending on the earmark.

FIG. 4 is a flowchart of an illustrative process 400, in accordance with the present invention, that receives a message including an earmark, and relays the content of the message one or more times depending on the earmark. As illustrated at 402, an iteration count parameter (i), an iteration limit parameter (N), a destination address, and content are received. As used herein, earmark refers to parameters such as for example, i, N, which are used to control the relaying or propagation of message content. In this illustrative configuration, this reception is made by a receiver which is part of WCD 200. At 404, a determination is made as to whether the iteration limit has been reached. In other words, the determination 404 is made as to whether the received message should be relayed. If the iteration limit has been reached, the process 400 ends at 406. In this illustrative process, the determination is made by comparing the value of the iteration count parameter to the iteration limit parameter, and considering equal values to mean the iteration value has been reached, and unequal values to mean that the iteration limit has not been reached. If the value of the iteration limit parameter is not equal to the iteration limit parameters then process 400 continues at 408 where the iteration count parameter is incremented to indicate that an additional message relay operation has been performed. At 410 a transmission is made of a message that contains the updated value of the iteration count parameter, the iteration limit parameter, the destination address and the content. The process then loops back to the determination 404. In some example configurations, provision is made to provide a time period between transmissions that is large enough to accommodate various signal processing operations that are carried out by receiving WCDs, such as, for example, FFT operations or decoding operations.

Still referring to FIG. 4, those skilled in the art and having the benefit of this disclosure will recognize that the determination at 404 can be alternatively constructed, and all such constructions that permit a determination to be made with respect to whether an iteration limit has been reached are considered to be within the scope of the described techniques. For example, the iteration count parameter may be compared to determine if it is less than the iteration limit parameter, in which case the process continues at 408. Similarly, by changing the initial value of the iteration limit parameter by one, the test for proceeding to the operation at 408 is changed to that of less than or equal (i.e., ending the process when i>N, rather than when i=N). In another example modification, the test for ending the process can be i being greater than or equal to N.

Figure 5:
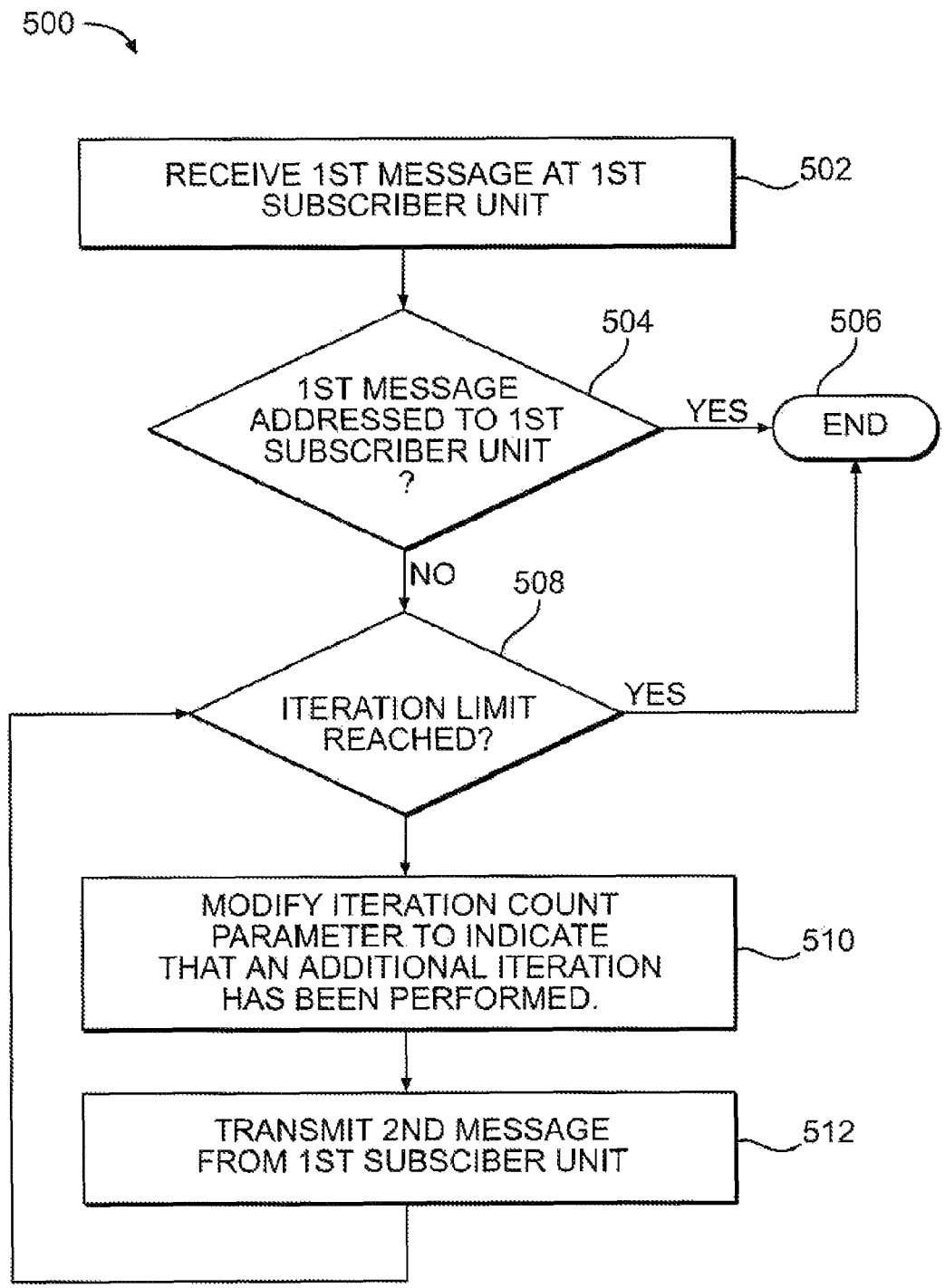
FIG. 5 is a flowchart of an illustrative process, in accordance with the present invention, that receives a message including an earmark and destination address, and relays the content of the message depending on the earmark and destination address.

FIG. 5 is a flowchart of an illustrative process 500, in accordance with the present invention, that receives a message including an earmark and destination address, and relays the content of the message depending on the earmark and destination address. At 502 a first message is received at a first WCD. The first message, may have originated with another WCD, or some other message originating transmitter. At 504 a determination is made as to whether the first message has been addressed to the first WCD. If the first message is addressed to the first WCD, then the message has arrived at its intended destination and process 500 ends at 506. If the first message is not addressed to the first WCD then a decision is required to be made regarding whether to relay the message content (i.e., perform an iteration). At 508 a determination is made as to whether the iteration limit has been reached. If the iteration limit has been reached then process 500 ends at 506. If the iteration limit has not been reached then, at 510, an iteration count parameter is modified to indicate that an additional iteration has been performed. A second message is then transmitted 512 from the first WCD, and the process loops back to the iteration limit determination 508. The second message includes the earmark with the updated iteration count parameter, the destination address and the content.

Still referring to FIG. 5, the determination of whether the iteration limit has been reached may be made in any suitable manner. In typical configurations, a computation resource, such as for example, a computer, compares the value of an iteration count variable to a predetermined value and based on the relative values thereof determines the operations to be performed subsequently. In one example configuration, the iteration count variable may be compared to the value zero, and a message relay performed if the iteration count variable is not zero, where the message relay operation includes reducing the value of the iteration count variable and passing that update value in the next message relay transmission. Alternatively, the iteration count variable may be compared to a fixed, non-zero, iteration limit. In an alternative configuration, the iteration count variable may be compared to an iteration limit parameter whose value is determined by the message originator.

The result of the process of FIGS. 4-5 is an expanding region of coverage, in response to the broadcast message being relayed. The result is that the region in which message relay occurs expands as the propagating message front reaches additional WCDs and those WCDs join in the transmission of the message. Once a WCD joins the message relay operation, it continues to relay the message until the network iteration limit is reached.

It is noted that the N relay transmissions need not all be made at the same data rate. In areas where message propagation is problematic, greater reliability with respect to message delivery may be obtained by transmitting, messages at a slower rate. In one configuration, a base station may effectively schedule which transmissions occur at a particular data rate by including control parameters with the message indicating, for example, that the first N1 transmissions (out of N) should proceed at a first rate R1, and the next N2 transmissions should proceed at a second rate R2, and so on.

In the message diffusion scheme described above, each message is repeated multiple times, resulting, in a system, that while low-cost with respect to adding a new user, is not particularly spectrally efficient. In other words, spectral efficiency has been sacrificed in exchange for this lowered cost. However, it is desirable to be as spectrally efficient as possible while still meeting cost objectives for a system. The message diffusion architecture described above has spectral inefficiencies resulting from repeating a message in areas that have already successfully received the message. In alternative configurations, greater spectral efficiency can be obtained by modifying the message diffusion so as to reduce the number of repeats.

Figure 6:
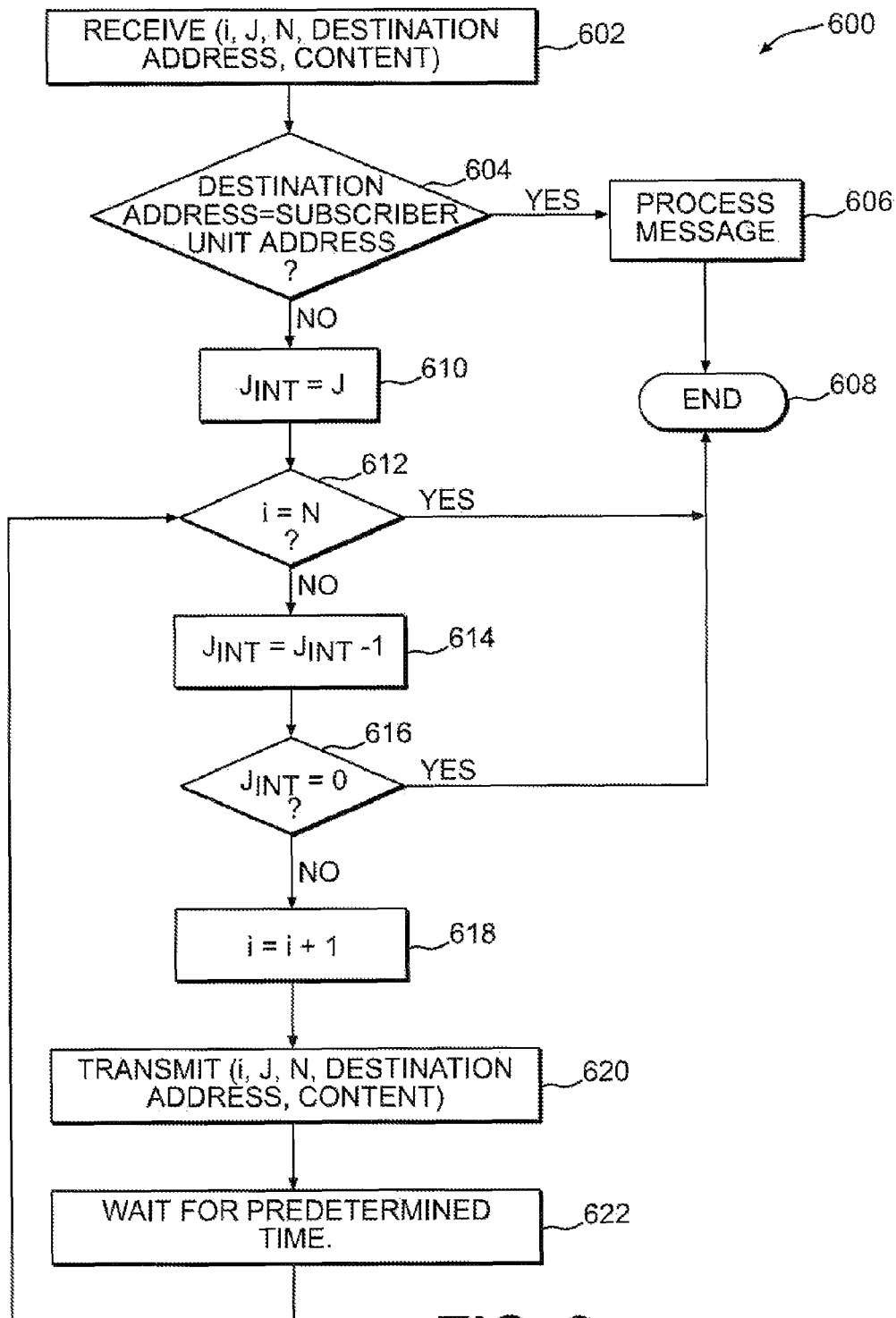
FIG. 6 is a flowchart of an illustrative process in accordance with the present invention that receives a message including an earmark and destination address, and relays the content of the message depending on the earmark and destination address.

In one such alternative example configuration, the nature of message diffusion is modified, such that the message propagates essentially as an annulus of expanding radius, rather than as a circle of expanding radius. This annulus may also be referred to as a message propagation ring. Since propagating the expanding message front is not effectively aided by simultaneous transmissions of units much further back, it is noted that the area interior to the expanding message annulus may be used to begin the propagation of another message. Such a modified message diffusion scheme allows multiple messages in the time of the N iterations. In an illustrative configuration, the earmark is modified to (i, J, N), meaning that this is the $i^{th}$ iteration of N total iterations and that each unit is to transmit the message exactly J times, provided that N is not exceeded. N is scaled to the distance of the recipient from the base station. J controls the width of the expanding message propagation ring. The larger the value of J is, the greater the reliability of the message transmission, whereas, the smaller the value of J is, the greater will be the spectral efficiency. FIG. 6, supra, illustrates a method in accordance with present invention which includes control of the message propagation ring width.

Referring now to FIG. 6, a process 600 of operating a WCD as part of a relay network, is illustrated. As indicated in the figure, a first message is received 602 at the WCD, wherein the first message includes an iteration count (i) an iteration limit (J), a network iteration limit (N), a destination address, and a content portion. The received destination address is compared to the address of the WCD to check for an address match 604. If the destination address matches the WCD address, then the first message is intended for this WCD and it is processed within the WCD 606. In other words, the message is not relayed by the WCD if that WCD is the intended destination of the message, and the process ends at 608.

If the message has arrived at a WCD that is not the intended destination, then processing is performed to relay the message. It is noted that in this illustrative configuration, that once it is determined that the WCD, which is to perform the message relay function, is in a transmit mode rather than a receive mode, then the WCD ignores the transmissions of other units while it is in this transmit mode. At 610, a variable $J_{int}$ is set equal to the value of the WCD iteration limit, J. The variable $J_{int}$ is the internal version of the WCD iteration limit. Typically, this variable is modified by the WCD. Since, as will be described more fully below, the WCD iteration limit J will need to be transmitted as part of the relayed message, its value needs to be preserved. A determination is made 612 as to whether the iteration count is equal to the network iteration limit. If the iteration limit has been reached then process 600 ends at 608. If the iteration limit has not been reached, then $J_{int}$ is modified 614 to indicate that one less iteration is allowed for the WCD. In this illustrative configuration the modification of the value of $J_{int}$ is accomplished by decrementing its value by one.

A determination is then made 616 as to whether the WCD iteration limit has been reached. In this illustrative configuration a test is performed to determine if $J_{int}$ has reached zero. If $J_{int}$ is zero then the WCD iteration limit has been reached and process 600 ends at 608. If $J_{int}$ is not zero then the WCD iteration limit has not been reached, and process 600 continues at 618 where the iteration count is modified to indicate that one more message relay has been performed. In this illustrative configuration the modification is accomplished by incrementing the iteration count by one.

Still referring to FIG. 6, the WCD transmits 620 a message that includes the updated value of the iteration count, the WCD iteration limit, the network iteration limit, the destination address, and the content. In the illustrative configuration of FIG. 6, the process of performing a message relay operation continues until either the iteration count reaches the network iteration limit, or the number of message relay operations reaches the WCD limit. As shown in the figure, process 600 includes waiting 622 for a predetermined amount of time before returning to iteration determination 612 and continuing the processing loop. The waiting for the predetermined amount results in there being a period of time between message relays. Such time period may be set so as to provide sufficient time for various computational and/or signal processing operations to take place. For example, enough time may be provided between the transmissions to allow a receiving unit to perform an FFT and/or a decoding operation. In an alternative example configuration the function of waiting a predetermined amount of time may be distributed throughout the processing loop rather than lumped into a single operation. In another alternative example configuration, the predetermined amount of time of wait operation 622 may be set to zero.

It will be appreciated by those skilled in the art and having the benefit of this disclosure that similar or equivalent means of modifying the iteration count and/or the internal WCD limit may be used. For example adding or subtracting numbers other than one may be performed, or shift operations, multiplications, or divisions may be performed, as long as the variables are modified in a known way such that a determination can be made that a particular limit has been reached or exceeded.

Figure 7A:
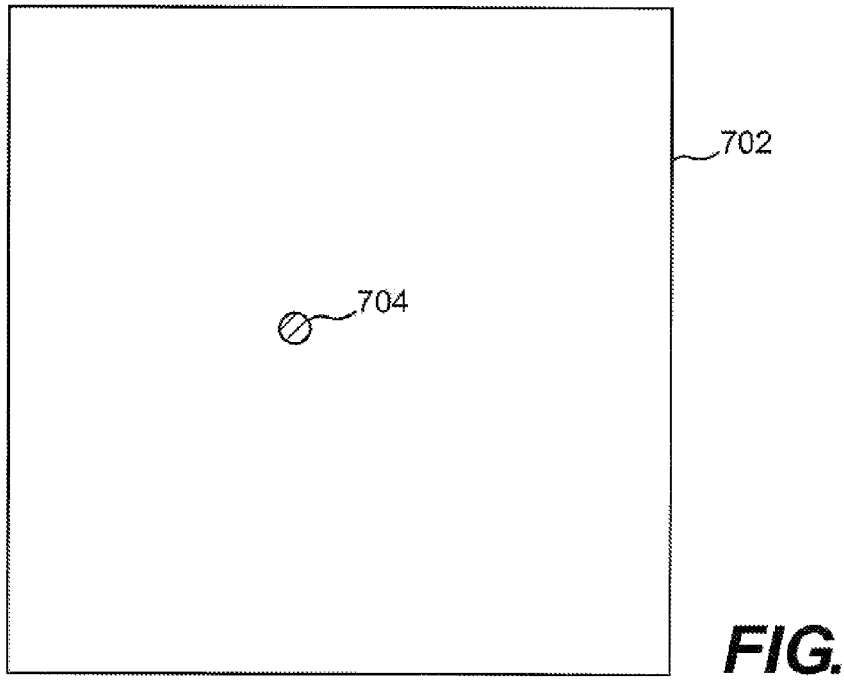
FIG. 7A is a schematic representation of a message propagation map after a first number of iterations, or message relays, of general message diffusion.
Figure 7B:
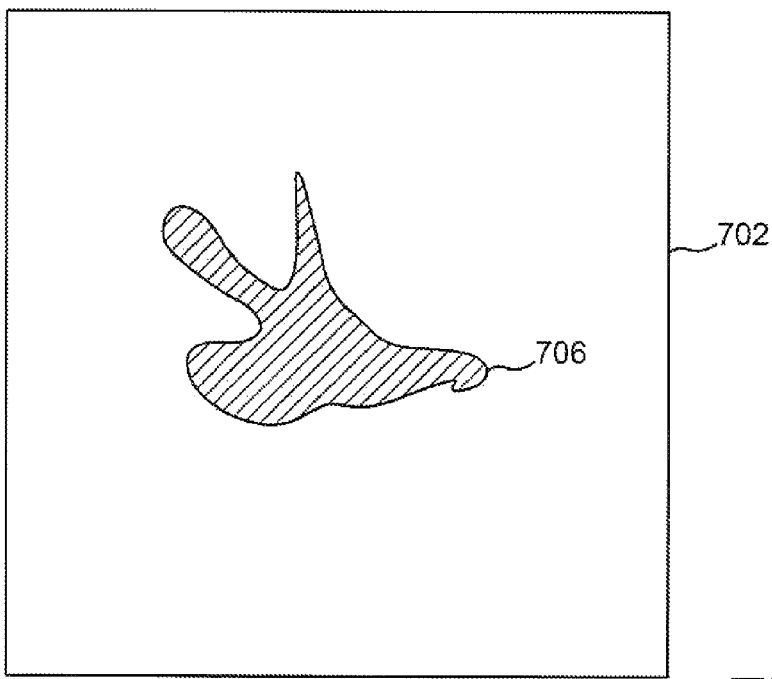
FIG. 7B is a schematic representation of the message propagation map of FIG. 7A, after a second number of iterations, or message relay, of general message diffusion.
Figure 7C:
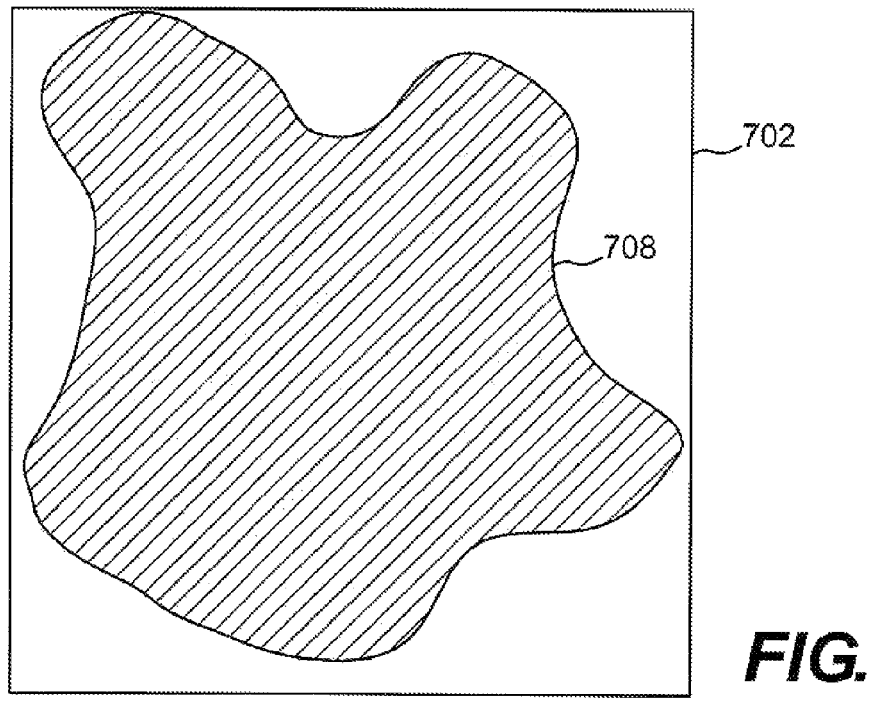
FIG. 7C is a schematic representation of the message propagation map of FIG. 7, after a third number of iterations, or message relays, of general message diffusion.
Figure 7D:
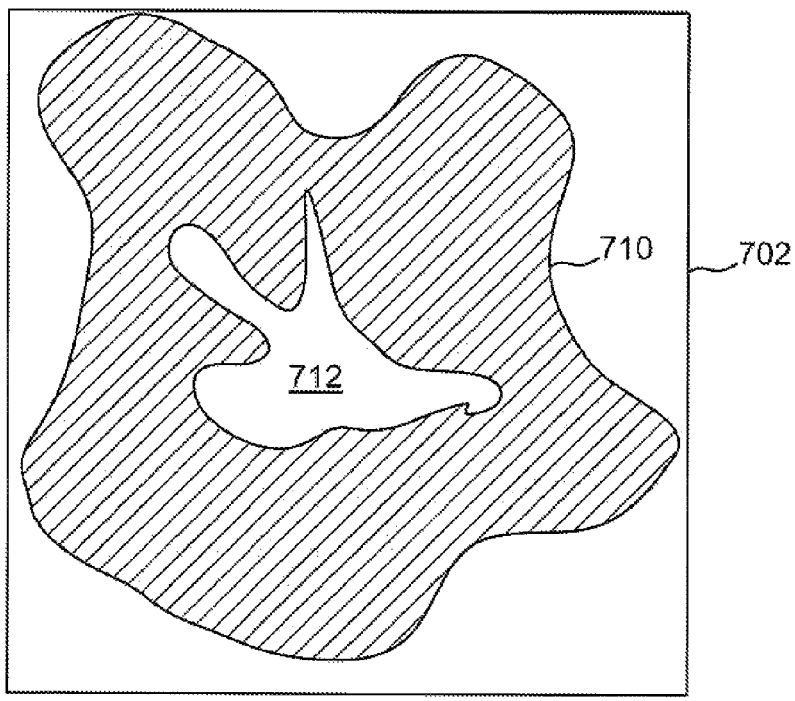
FIG. 7D is a schematic representation of a message propagation map after several rounds of iterations, or message relays, of annular message diffusion.

The advantage of process 600 of FIG. 6 can be seen more clearly with reference to FIGS. 7A-7D. FIGS. 7A-7C show the expanding region in which message relay takes place upon each iteration of the message relay operation where messages propagate outwardly blindly by diffusion. FIGS. 7C-7D show the effect of including a WCD iteration limit, as will be described below.

As seen in FIGS. 7A-7D regions of coverage in which a relayed message is broadcast expand in accordance with the processes described above in connection with FIGS. 4-6. More particularly, FIG. 7A, illustrates a neighborhood 702 which includes a plurality of WCDs of the type described above in connection with FIG. 2. A region 704 is representative of the area in which WCDs are performing a message relay during a first iteration. FIG. 7B again illustrates neighborhood 702, but shows a region 706 that is representative of the area in which WCDs are performing a message relay during a second iteration. FIG. 7C also illustrates neighborhood 702, and shows a region 708 that is representative of the area in which VCDs are performing a message relay during a third iteration. As can be seen from the sequence illustrated in FIGS. 7A-7C, the region in which message relay occurs expands as the propagating message front reaches additional WCDs and those WCDs join in the transmission of the message. In this illustrative example configuration, once a WCD joins the message relay operation, it continues to relay the message until the network iteration limit is reached.

It is noted that the N relay transmissions need not all be made at the same data rate. In areas where message propagation is problematic, greater reliability with respect to message delivery may be obtained by transmitting messages at a slower rate. In one example configuration, a base station may effectively schedule which transmissions occur at a particular data rate by including control parameters with the message indicating, for example, that the first N1 transmissions (out of N) should proceed at a first rate R1, and the next N2 transmissions should proceed at a second rate R2, and so on.

Message Diffusion and Spectral Efficiency

It is noted that in the message diffusion scheme described above, each message is repeated multiple times, resulting in a system, that while low-cost with respect to adding a new user, is not particularly spectrally efficient. In other words, spectral efficiency has been sacrificed in exchange for this lowered cost. However, it is desirable to be as spectrally efficient as possible while still meeting cost objectives for a system. Various alternative example configurations are described below that incorporate one or more techniques, such as, but not limited to, sectorization, for improving the spectral efficiency of message delivery to the home by message diffusion in accordance with the present invention.

In particular it is noted that the message diffusion architecture described above has spectral efficiencies resulting from repeating a message multiple times in areas that have already successfully received and retransmitted the message. In alternative example configurations, greater spectral efficiency can be obtained by modifying the message diffusion so as to reduce the number of repeats.

Expanding Coverage Regions

The expanding region depicted in FIGS. 7A-7C result from the message relay taking place on each iteration of the message relay operation where messages propagate outwardly blindly by diffusion. FIG. 7D is similar to FIG. 7C but shows the effect of including a WCD iteration limit. More particularly, FIG. 7D shows neighborhood 702, and a region 710, that is representative of the area in which WCDs are performing a message relay during a third iteration. A region 712 is shown that represents the area in which WCDs have completed the number of message relays specified by the WCD iteration limit.

It is noted that once a WCD has completed the allowed number of message relay transmissions it switches from transmit mode back to receive mode. It is further noted that, in the scenario of an outwardly expanding annular propagation ring, the radio signals from the annulus still propagate in the backward as well as forward direction. In view of this, it is important that a WCD that has completed its message relay operation does not "see" the same message that it just completed relaying as a new message that it is to begin relaying again; or alternatively not respond to receipt of that message. One way to prevent such a situation is to provide a way for the WCD to determine if it has already relayed the message that it is now receiving. More particularly, a message identification (ID) code may be included in a message by a message originator, and the WCD may extract, and then store, at least temporarily, the message ID code. By checking an internal list of message ID codes that represent recently relayed messages, a WCD can determine whether to ignore an incoming message, at least in terms of whether to relay that incoming message.

Figure 8:
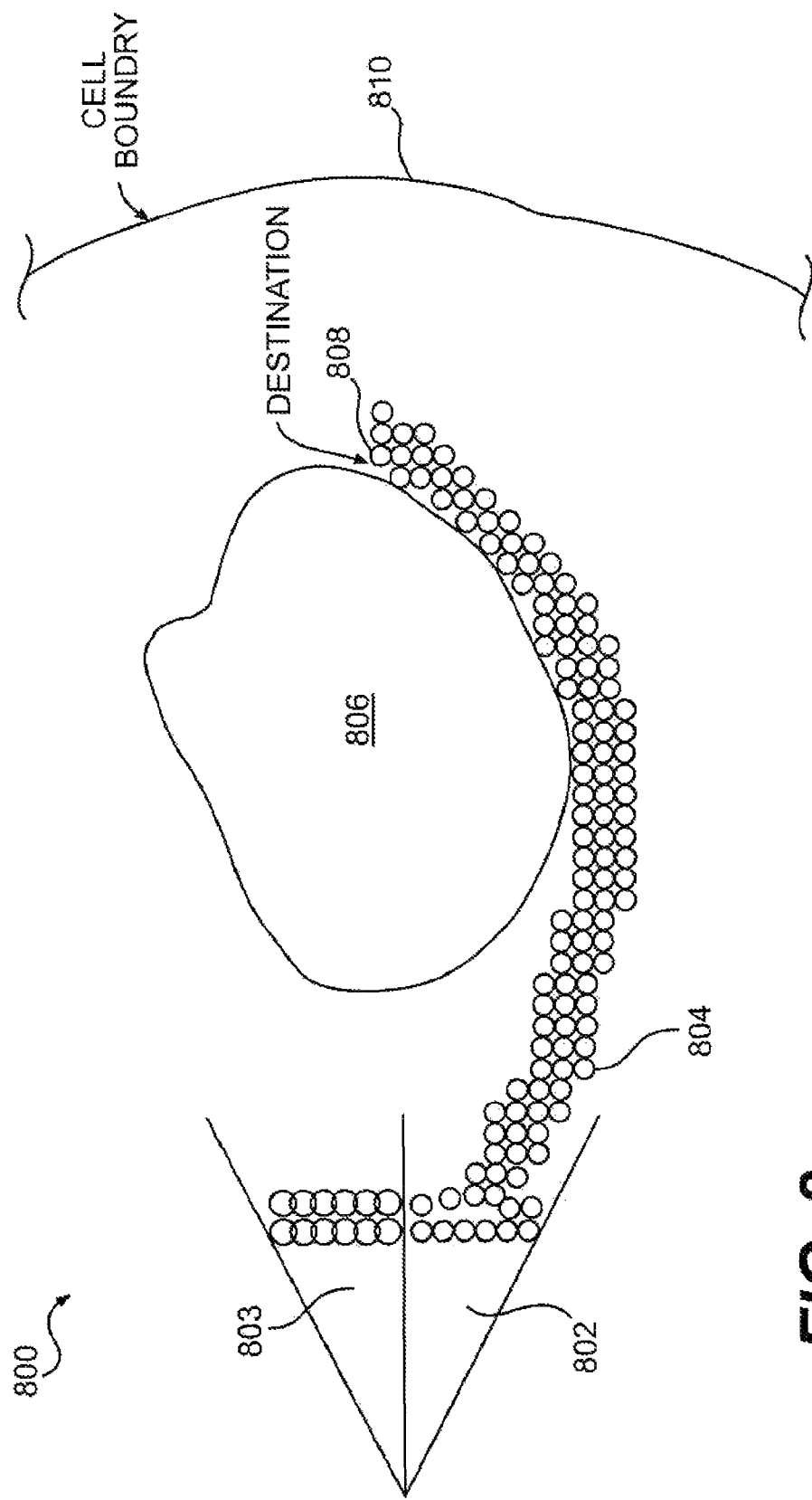
FIG. 8 is a schematic representation of a message propagation map indicating sectorization which leads to river-like patterns of message diffusion.

In another alternative configuration, improvements in the spectral efficiency of the message diffusion scheme can be obtained by applying techniques similar to those used for cellular communications. Since, the only interference that a particular message must endure from an adjacent cell, in which transmissions are made on the same, or substantially similar, frequency, is from the thin epidermis of users on the outer edge of that adjacent cell; and since most transmissions terminate before the cell edge, the base stations in this illustrative configuration coordinate with each other such that transmitters located in the adjacent epidermis of each cell are not transmitting at the same time. In this way, a frequency reuse of one (K=1) is achieved. Although spectral efficiency is improved, it is not as great as it could be because a message is still repeated multiple times. However, in a still further alternative example configuration, spectral efficiency may be further improved by including sectorization techniques. Sectorization techniques allow a multiplication in the number of messages carried per time slot, wherein that multiplication is proportional to the number of sectors. It is noted that, in example configurations which include sectorization, it is preferable that the base stations include guard sectors between sectors in which different messages are propagating. FIG. 8 illustrates a message propagation map in which a message is transmitted to a sector by way of a sectorized antenna beam, and the message is relayed by WCDs through a cell, or neighborhood, wherein the cell includes areas where no WCDs are available.

In a terrestrial OFDM multi-hop communication network in which low-power transmissions from multiple nodes reinforce reception at receiving nodes, and messages originate from a base station, a semi-blind diffusion protocol reduces inter-sector interference through quasi-static zone-based routing near the sector edges. Each sector has a central region in which messages diffuse blindly, and further has nodes at, or near, sector boundaries that maintain quasi-static routing tables so as to route messages destined for a node near the sector edge. These nodes do not participate in undirected message diffusion or retransmission, thereby forming quiet zones near the sector boundaries. Nodes at, or near, the sector boundaries may be added to, or deleted from those that engage in the quasi-static zone-based routing based, at least in part, upon monitoring of the message error rate at each node. In a further aspect, forward link capacity is increased by coupling the base station to one or more low-power transmitter hubs to concurrently initiate diffusion of different messages. In blind diffusion, a receiver receiving a message for the first time is receiving the superposition of signals from many transmitters, all of which received the message at an earlier tine (last iteration or earlier).

Referring now to FIG. 8, a portion of a cell 800 is shown. A first sector antenna beam 802 is the source of a first message which is then received by a first plurality of WCDs 804. The WCDs, in turn, relay the message which is further relayed by other WCDs that have received the relayed message. Eventually, the message is received at a WCD 808 which is the intended destination of the message. It can be seen that messages propagate around a region 806 in which no WCDs are available. Additionally, a boundary 810 defines the extent of the cells.

In a still further alternative example configuration, techniques are introduced for effective management of the improved spectral efficiency of the message diffusion scheme for broadband terrestrial delivery of information. More particularly, each cell is divided into zones, and each WCD is assigned a unique zone. Further, each WCD includes a look-up table from which the zones supported by the WCD can be determined. In this illustrative configuration, such a look-up table is the same for all WCDs in a zone. A WCD in this configuration only transmits for a zone that it supports. In operation, earmarks are transmitted with parameters (i, J, N, Z) where Z is the zone number of the zone in which the destination WCD is located. This arrangement allows messages to propagate in relatively thin pathways rather than as an expanding annulus. Such thin pathways are referred to herein as "rivers". Sectorized antennas can launch several sectorized rivers at once. It is noted that rivers need not be straight. In fact these message propagation rivers can flow around regions in which no active or participating WCDs are available for message propagation. With respect to the "thinness" of message propagation rivers, it is noted that these can be quite narrow, and more particularly, that sectorized base stations can excite multiple zones in a "blob", where a blob is several zones across. In such an arrangement, messages propagate by moving blob rather than by expanding ring. It is also noted that, with respect to the thin, or narrow, message propagation rivers, only a small percentage of the cell epidermis is in use at any particular time.

One possible limitation of such a message propagation scheme is that there may be a bottleneck problem at the base station in that a sector could support many propagating blobs but the number of blobs is constrained by how may the sector can launch.

The message propagation of FIG. 8 can be described as a message propagation river between originating sector antenna beams 802, 803 and destination 808. The size of zones and blobs may be established in any particular design by the system architect. In an illustrative configuration, a zone may be, for example, one or two blocks across, and a blob may be, for example, several zones across. Some constraints exist in this system in order to insure reliable delivery of a message. For example, blobs must be large enough to insure reliable delivery of a message; and the WCDs within zones immediately around a blob (i.e., several zones deep) must not be used for transmission while the WCDs within the blob are transmitting. If the WCDs in the zones immediately around those of the transmitting blob do not refrain from transmitting, then a receiver may hear, with adverse consequences, several transmitters all transmitting the same message and others (even one or two) transmitting a different message. Additionally with respect to insuring reliable message delivery, it is noted that while message propagation between two points may generally be poor, there may be sneak paths that have good propagation characteristics, and provision should be made for protecting against such sneak paths. Such protection against sneak paths may take the form of appropriate zone planning, wherein WCDs that are operable to communicate with one another, without the message relay services of an intervening unit, are assigned to at least one zone in common with each other.

Zone Definitions

Figure 9:
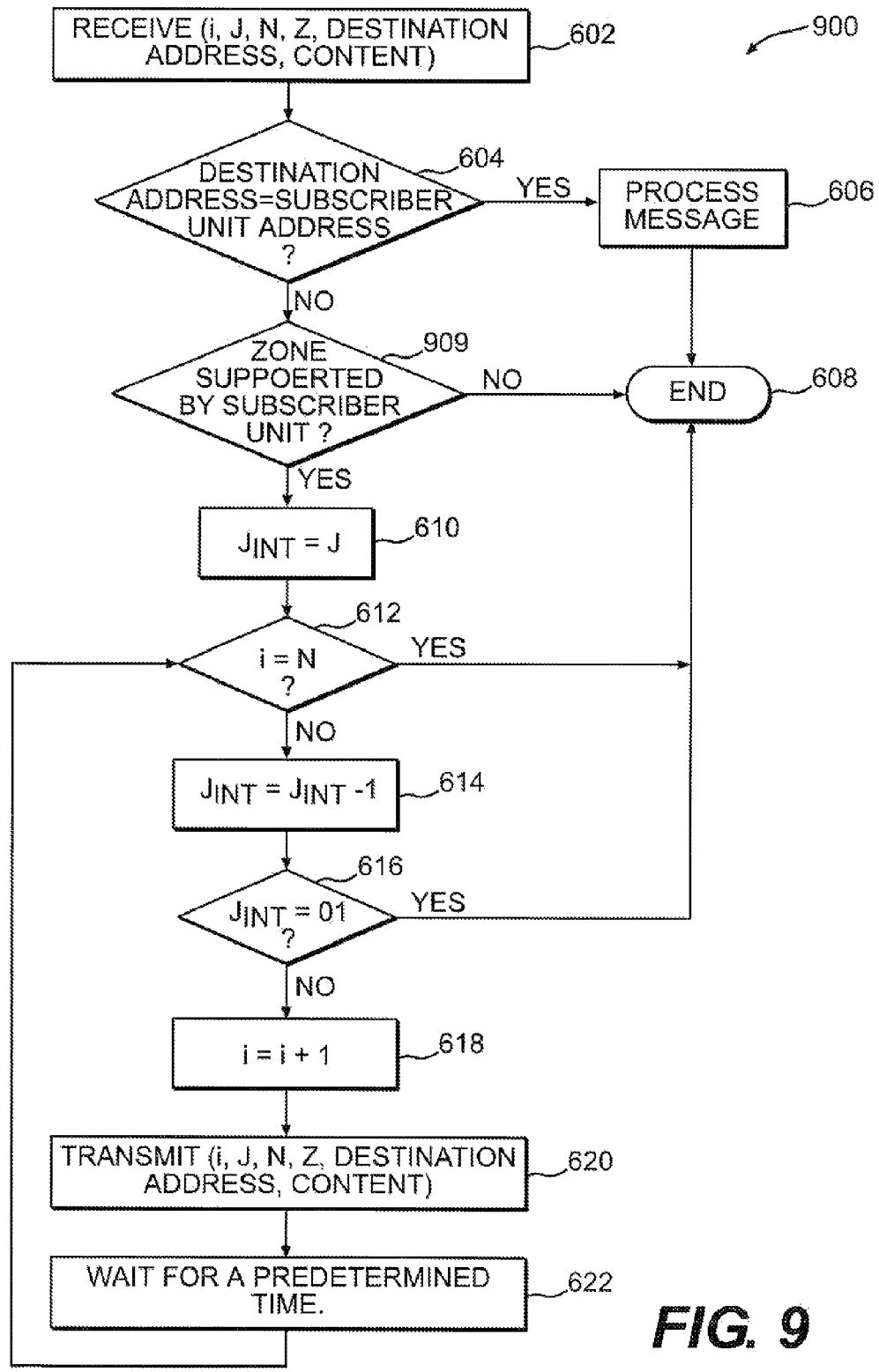
FIG. 9 is a flowchart of an illustrative process in accordance with the present invention that receives a message including an earmark having a zone parameter and destination address, and relays the content of the message depending on the earmark and destination address.

FIG. 9 illustrates a technique which includes zone definitions. Referring to FIG. 9, a process 900 of operating a WCD as part of a relay network, is illustrated. Process 900 is similar to process 600 of FIG. 6 (which is described in detail above). Process 900 is different from process 600 in the following ways: First, the message received by the WCD includes a zone parameter, in addition to iteration count (i), subscriber iteration limit (J), network iteration limit (N), the destination address, and a content portion that are used with process 600. Second, if it is determined at 604 (of FIG. 9) that the destination address of the message indicates that this message is not intended for this WCD, then a determination is made 909 as to whether the zone parameter represents a zone that is supported by this WCD. When a zone is supported by a WCD, that subscriber will relay messages having that zone parameter, provided all other constraints for relaying the message are met. Third, if the determination at 909 is negative, then process 900 ends at 608. Fourth if the determination at 909 is affirmative, i.e., the received message is one that should be relayed to a supported zone, then control passes to the operation at 610, which has already be described above.

In one example configuration, the WCD maintains a look-up table such that its computational resource may compare the received zone parameter to a list of supported zones. As will be appreciated by those skilled in the art, the list of supported zones may be stored in any suitable memory including but not limited to random access memory, sequential access memory, or content addressable memory. Further it will be appreciated that with a large enough local storage, the WCD may make the determination of 909 on granularity of individual WCDs rather than on groups of WCDs in a zone.

Device Construction

Figure 10:
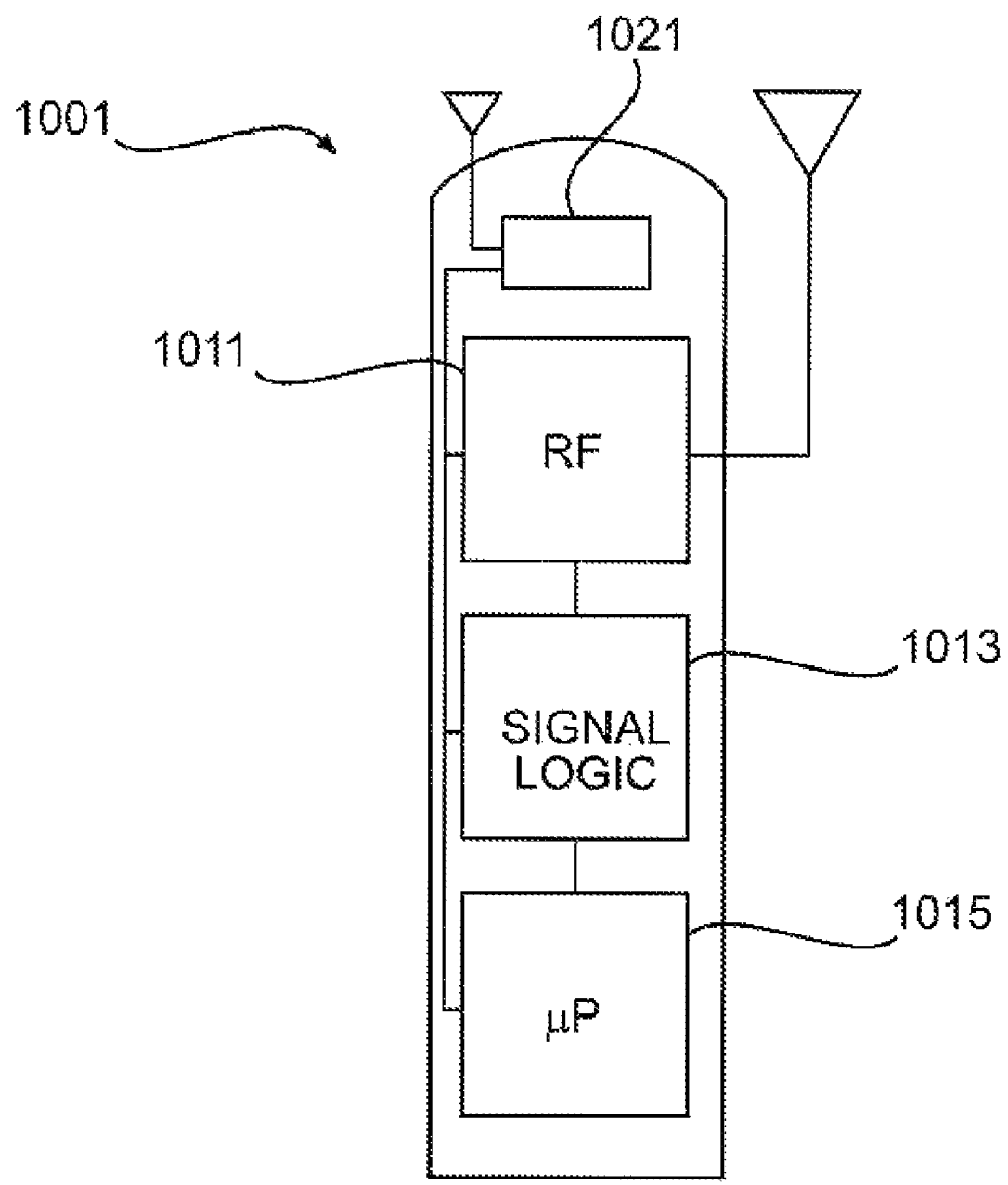
FIG. 10 is a schematic block diagram of a WCD constructed in accordance with the present invention.

FIG. 10 is a schematic block diagram of a WCD 1001 constructed in accordance with the present invention. The WCD 1001 includes and RF circuit 1011, for communicating with the other WCDs, base stations or access points, and processing circuitry 1013 for processing the communications. By way of example, processing circuitry can include spreader, despreaders and related logic. The WCD 1001 includes a processor 1015 that performs control functions, although in many cases the processor 1015 is integrated with the processing circuitry 1013 and may be further integrated with the RE circuit 1011. Further communication circuitry 1021 may be used to provide further communication functions such as, by way of example, 802.11 WLAN communications or 802.15 communications. The components 1011, 1014, 1015 are capable of executing processing instructions, and can be provided as a chipset, or combined as one or more monolithic integrated circuit chips.

Functional Operation

Figure 11:
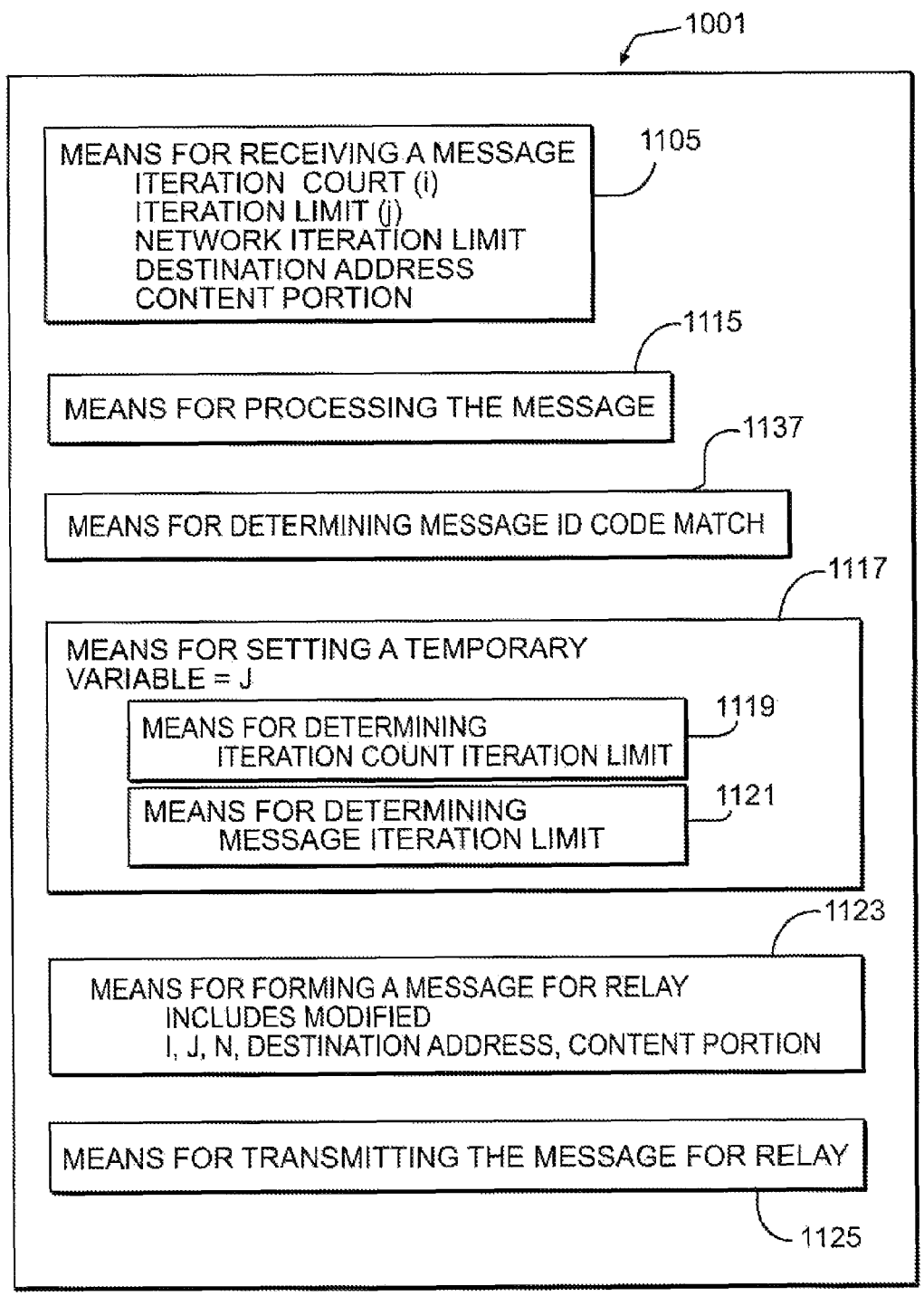
FIG. 11 is a diagram depicting the functional operation of a WCD.

FIG. 11 is a diagram depicting the functional operation of a WCD 1101. The WCD 1101 includes means 1105 for receiving a message including an iteration count (i), an iteration limit (J), a network iteration limit, a destination address, and a content portion. The means for receiving 1105 may be provided by RE section 1011 FIG. 10). Also included are means 1115 for processing the message if the destination address matches an address for that WCD, and means 1117 for setting a temporary variable equal to the value of J. Also included are means 1119 for determining whether the iteration count reached an iteration limit, and if not, then modifying the temporary variable to indicate an iteration change, means 1121 for determining whether the message reached an iteration limit, and modifying i to indicate that one more iteration has been performed, and means 1123 for forming a message for relay that includes the modified i, J, N, the destination address, and the content portion. The means for processing 1115 means fir setting a temporary variable 1117 includes means for determining the iteration count limit 1119 and 1121 and means for forming a message for relay may be provided by the signal logic 1013 and processor 1015 (FIG. 10). Also included are means 1125 for transmitting the message for relay, which may be provided by RE section 1011 (FIG. 10).

The WCD 1111 may also include means 1137 for determining whether a message ID code received in the message matches at least one message ID code stored in a list of message ID codes, the stored list of message ID codes indicative of messages previously relayed by the WCD and in the case of the message ID code not matching a message ID code in the stored list, causing the means for transmitting to transmit the message for relay. The functions of the means or determining whether the message ID code matches may be provided by processor 1015 (FIG. 10).

CONCLUSION

Wireless broadband message delivery in accordance with the present invention includes message propagation by diffusion. Application of the methods and apparatus provide for the wireless delivery of information or content, and more particularly provide for cost-effective consumer-oriented wireless broadband delivery of information or content to homes or other locations.

An advantage of some example configurations of the described techniques is that the cost of adding a user to the system is relatively small compared to conventional approaches.

An advantage of some example configurations of the described techniques is programmable control of the trade-off between delivery reliability and spectral efficiency.

An advantage of some example configurations of the described techniques is that fewer base stations are required than would be with conventional radio network architectures.

An advantage of some example configurations of the described techniques is the utilization of frequency bands that are otherwise unusable or impractical to use in a conventional radio network for distribution of information or content.

Various aspects of the described techniques may be implemented as circuit-based solutions, including possible implementation on a single integrated circuit. As would be apparent to one skilled in the art, various functions of circuit elements may also be implemented as processing operations in a software program. Such software may be employed in, for example, a digital signal processor, micro-controller, or general-purpose computer.

The present invention can be embodied in the form of methods as well as apparatus for practicing those methods. The present invention can also be embodied in the form of program code embodied in tangible media, such as punched cards, magnetic tape, floppy disks, hard disk drives, CD-ROMs, flash memory cards, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It is to be understood that the present invention is not limited to the embodiments described above, but encompasses any and all embodiments within the scope of the subjoined.

What is claimed is:

1. A communication method, comprising:
   transmitting a message in a wide spectrum format signal format allowing reception of signals with multiple time delays, wherein the message comprises parameters including at least an iteration count (i), an iteration limit (J), a network iteration limit (N), a destination address, and a content portion, wherein:
   the iteration count (i) is updated at each occurrence of a relaying of the message,
   the iteration limit (J) is a maximum number of times that a single node can relay the message,
   the network iteration limit (N) is a maximum number of relay occurrences in a continuous series of relaying of the message amongst a plurality of nodes; and
   selectively iteratively relaying the message with an updated iteration count (i), the iteration limit (J), the network iteration limit (N), the destination address, and the content portion, wherein selectively iteratively relaying the message further comprises:
   (a) receiving the message at a wireless communication device (WCD);
   (b) processing the message if the destination address matches an address for the WCD, if not, then performing (c);
   (c) setting a temporary variable ($J_{int}$) equal to the iteration limit (J);
   (d) determining whether the iteration count (i) reached the network iteration limit (N), and if yes, then ignoring the message, if no, then performing (e);
   (e) determining whether $J_{int}$ has reached zero, if yes, then ignoring the message, if no, then decrementing $J_{int}$ to indicate one additional relaying of the message and updating i to indicate one additional relaying of the message and performing (f);
   (f) transmitting a message from the WCD that includes the updated i, the J, the N, the destination address, and the content portion; and
   (g) repeating (d) through (f).

2. The method of claim 1, further comprising providing an orthogonal frequency division multiplex (OFDM) signal as the communication signal.

3. The method of claim 1, further comprising:
   providing an orthogonal frequency division multiplex (OFDM) signal as the communication signal, whereby the OFDM signal provides a semi-blind diffusion protocol, whereby determining a sector for the destination address of the message;

wherein the semi-blind diffusion protocol comprises forming a quiet zone in the sector, wherein nodes in the sector are added to the quiet zone based on message error rate for each node indicating the node is near the boundary of the sector, nodes in the quiet zone employ quasi-static zone based routing to relay the message to the destination address, nodes of the sector that are not in the quiet zone employ blind diffusion to relay the message.

4. The method of claim 3, further comprising:

monitoring a signal error rate at each of the nodes in the sector; and adding and deleting nodes to the quiet zone according to the monitored signal error rate.

5. The method of claim 4, further comprising coupling a first station to one or more further transmitter hubs to concurrently initiate diffusion of different communications.

6. The method of claim 1, further comprising:

providing communication propagation of messages by diffusion, including broadcasting from a low-power transmitter of a first WCD, and relaying to additional WCDs for iteratively relaying to an intended destination receiver associated with the destination address.

7. The method of claim 1, wherein the parameters further comprise a zone (Z) that indicates the zone in which a device that is the intended recipient of the message having the destination address is located, the zone is one of a plurality of zones, at least one sectorized antenna is employed to relay the message to the zone.

8. The method of claim 1, wherein the parameters further comprise a message identification code (ID) that identifies the message, wherein a device that receives the message compares the message identification code (ID) against a stored list of message identification codes for messages that the device has relayed, the device will not relay the message if the message identification code (ID) matches a message identification code in the stored list.

9. A machine readable medium comprising instructions for performing the method of claim 1.

10. A communication method, comprising:

receiving, at a wireless communication device (WCD), a message, the message comprises parameters including at least an iteration count (i), an iteration limit (J), a network iteration limit (N), a destination address, and a content portion, wherein:

the iteration count (i) is updated at each occurrence of a relaying of the message, the iteration limit (J) is a maximum number of times that a single node can relay the message, the network iteration limit (N) is a maximum number of relay occurrences in a continuous series of relaying of the message amongst a plurality of nodes; and selectively iteratively relaying the message with an updated iteration count (i), the iteration limit (J), the network iteration limit (N), the destination address, and the content portion, wherein selectively iteratively relaying the message further comprises:

(a) processing the message if the destination address matches an address for the WCD, if not, then performing (b);

(b) setting a temporary variable ($J_{int}$) to indicate a number times that the message can be relayed by the WCD equivalent to the iteration limit (J);

(c) determining whether the iteration count (i) reached the network iteration limit (N), and if yes, then ignoring the message, if no, then performing (d);

(d) determining whether $J_{int}$ indicates that the WCD does not have any remaining times for relaying the message, if yes, then ignoring the message, if no, then adjusting $J_{int}$ to indicate one additional relaying of the message and updating i to indicate one additional relaying of the message and performing (e);

(e) transmitting a message from the WCD that includes the updated i, the J, the N, the destination address, and the content portion; and (f) repeating (c) through (e).

11. The method of claim 10, further comprising transmitting the communication signal in an orthogonal frequency division multiplex (OFDM) format.

12. The method of claim 11, whereby:

the OFDM signal provides a semi-blind diffusion protocol; and determining a sector for the destination address of the message;

wherein the semi-blind diffusion protocol comprises forming a quiet zone in the sector, wherein nodes in the sector are added to the quiet zone based on message error rate for each node indicating the node is near the boundary of the sector, nodes in the quiet zone employ quasi-static zone based routing to relay the message to the destination address, nodes of the sector that are not in the quiet zone employ blind diffusion to relay the message.

13. The method of claim 10, wherein the parameters further comprise a zone (Z) that indicates the zone in which a device that is the intended recipient of the message having the destination address is located, the zone is one of a plurality of zones, at least one sectorized antenna is employed to relay the message to the zone.

14. The method of claim 10, wherein the parameters further comprise a message identification code (ID) that identifies the message, wherein the WCD compares the message identification code (ID) against a stored list of message identification codes for messages that the WCD has relayed, the WCD does not relay the message if the message identification code (ID) matches a message identification code in the stored list.

15. The method of claim 10, further comprising determining whether the destination address of the received message is an address associated with the WCD.

16. The method of claim 10, wherein said determining whether $J_{int}$ indicates that the WCD does not have any remaining times for relaying the message comprises performing an operation on $J_{int}$ and evaluating the result of the operation.

17. The method of claim 16, wherein the performing an operation on $J_{int}$ comprises determining whether $J_{int}$ has reached zero or determining whether $J_{int}$ has reached J.

18. The method of claim 10, wherein determining whether the iteration count (i) reached the network iteration limit (N) comprises determining a relative magnitude of the iteration count (i) parameter and the network iteration limit (N) parameter.

19. The method of claim 13, further includes determining whether to relay the message based upon determining whether the zone (Z) parameter in the message matches a zone parameter in a stored list of parameters at the WCD.

20. The method of claim 10, wherein the message parameters further comprises a plurality of data rate control parameters that indicate at least two distinct data transmission rates, one for each of two different iteration count (i) values, wherein the message is relayed at the indicated data transmission rate for corresponding iteration count (i) value.

21. The method of claim 10, wherein updating i to indicate one additional relaying of the message comprises incrementing a value of i.

22. The method of claim 10, wherein adjusting $J_{int}$ to indicate one additional relaying of the message comprises decrementing a value of $J_{int}$.

23. The method of claim 10, wherein adjusting $J_{int}$ to indicate one additional relaying of the message comprises incrementing a value of $J_{int}$.

24. A method of operating a wireless communication device (WCD) as part of a relay network, comprising:
(a) receiving, at a wireless communication device (WCD), a message including an iteration count (i), an iteration limit (J), a network iteration limit (N), a destination address, and a content portion, wherein:
the iteration count (i) is updated at each occurrence of a relaying of the message,
the iteration limit (J) is a maximum number of times that a single node can relay the message,
the network iteration limit (N) is a maximum number of relay occurrences in a continuous series of relaying of the message amongst a plurality of nodes;
(b) processing the message if the destination address matches an address for the WCD, if not, then perform (c);
(c) setting a temporary variable ($J_{int}$) equal to the iteration limit (J);
(d) determining whether the iteration count (i) reached the network iteration limit (N), and if yes, then ignoring message, if no, then performing (e);
(e) determining whether $J_{int}$ has reached zero, if yes, then ignoring the message, if no, then decrementing $J_{int}$ to indicate one additional relaying of the message and updating i to indicate one additional relaying of the message and performing (f);
(f) transmitting a message from the WCD that includes the updated i, the J, the N, the destination address, and the content portion; and
(g) repeating (d) through (f).

25. The method of claim 24, further comprising transmitting the message by transmitting a signal in an orthogonal frequency division multiplex (OFDM) format.

26. The method of claim 24, further comprising:
waiting a predetermined amount of time prior to (f);
waiting to receive a second message if the network iteration limit (N) has been reached;
waiting to receive a second message if the iteration limit (J) has been reached;
determining whether a message ID code received in the message matches at least one message ID code stored in a list of message ID codes, the stored list of message ID codes indicative of messages previously relayed by the WCD;
in the case of the message ID code not matching a message ID code in the stored list, performing the transmitting of step (f); and
in the case of the message ID code matching a message ID code in the stored list, waiting to receive a second message.

27. A wireless communication device (WCD) for use in network communications, the WCD comprising:
means for receiving a message comprising parameters including at least an iteration count (i), an iteration limit (J), a network iteration limit (N), a destination address, and a content portion, wherein:
the iteration count (i) is updated at each occurrence of a relaying of the message,
the iteration limit (J) is a maximum number of times that a single node can relay the message,
the network iteration limit (N) is a maximum number of relay occurrences in a continuous series of relaying of the message amongst a plurality of nodes; and
means for selectively relaying the message with an updated iteration count (i), the iteration limit (J), the network iteration limit (N), the destination address, and the content portion, wherein the means for selectively relaying the message further comprises:
(a) means for processing the message if the destination address matches an address for the WCD, if not, then perform (b);
(b) means for setting a temporary variable ($J_{int}$) to indicate a number times that the message can be relayed by the WCD equivalent to the iteration limit (J);
(c) means for determining whether the iteration count (i) reached the network iteration limit (N), and if yes, then ignore message, if not, then perform (d);
(d) means for determining whether $J_{int}$ indicates that the WCD does not have any remaining times for relaying the message, if yes, then the message is ignored, if no, then adjusting $J_{int}$ to indicate one additional relaying of the message and updating i to indicate one additional relaying of the message and perform (e);
(e) means for transmitting a message from the WCD that includes the updated i, the J, the N, the destination address, and the content portion; and
(f) means for repeating (c) through (e).

28. The WCD of claim 27, wherein the means for selectively relaying the message further includes means for providing an orthogonal frequency division multiplex (OFDM) signal as a transmitted signal for the message.

29. The WCD of claim 27, wherein the means for selectively relaying the message further determines a sector location of the message; wherein the means for selectively relaying the message comprises means for relaying the message to the sector location, wherein the sector location includes a quiet zone, wherein nodes in the sector location are added to the quiet zone based on message error rate for each node indicating the node is near the boundary of the sector, nodes in the quiet zone employ quasi-static zone based routing to relay the message to the destination address, nodes of the sector location that are not in the quiet zone employ blind diffusion to relay the message.

30. The WCD of claim 27, wherein the parameters further comprise a message identification code (ID) that identifies the message, wherein the means for selectively relaying the message further comprises means for comparing the message identification code (ID) against a stored list of message identification codes for messages that the WCD has relayed, the means for selectively relaying the message not relaying the message if the message identification code (ID) matches a message identification code in the stored list.

31. A communications system, comprising:
a message originating transmitter operable to transmit a message, wherein the message comprises parameters including at least an iteration count (i), an iteration limit (J), a network iteration limit (N), a destination address, and a content portion, wherein:
the iteration count (i) is updated at each occurrence of a relaying of the message,
the iteration limit (J) is a maximum number of times that a single node can relay the message,
the network iteration limit (N) is a maximum number of relay occurrences in a continuous series of relaying of the message amongst a plurality of nodes;
a first plurality of wireless communication devices (WCDs), each of the first plurality of WCDs operable to receive the message and selectively update the iteration count (i) parameter to have a second value, and selectively relay the message including the updated iteration count (i) with the second value, the iteration limit (J), the network iteration limit (N), the destination address, and the content portion; and a second plurality of WCDs, each of the second plurality of WCDs operable to receive the relayed message and selectively update the iteration count (i) parameter to have a third value, and selectively relay the message including the updated iteration count (i) with the third value, the iteration limit (J), the network iteration limit (N), the destination address, and the content portion; and wherein each of the first plurality of WCDs and the second plurality of WCDs selectively update the iteration count (i) and selectively relay the message in accordance with operation that:

(a) process the message if the destination address matches an address for the WCD, if not, then performing (b), (b) set a temporary variable ($J_{int}$) to indicate a number times that the message is relayable by the WCD equivalent to the iteration limit (J), (c) determine whether the iteration count (i) reached the network iteration limit (N), and if yes, then ignore the message, if no, then perform (d), (d) determine whether $J_{int}$ indicates that the WCD does not have any remaining times for relaying the message, if yes, then ignore the message, if no, then adjust $J_{int}$ to indicate one additional relaying of the message and update i to indicate one additional relaying of the message and perform (e), (e) transmit a message from the WCD that includes the updated i, the J, the N, the destination address, and the content portion, and (f) repeat (c) through (e); and a message destination receiver operable to receive at least one of the relayed messages.

32. The communications system of claim 31, wherein the message originating transmitter is adapted to produce the message as an OFDM transmission.

33. The communications system of claim 32, wherein the message originating transmitter is adapted to produce a sectorized beam.

34. A chipset including at least one semiconductor integrated circuit chip, for use in a wireless communication device (WCD), the chipset comprising:

a receiver circuit that receives a message comprising parameters including at least an iteration count (i), an iteration limit (J), a network iteration limit (N), a destination address, and a content portion, wherein:
the iteration count (i) is updated at each occurrence of a relaying of the message,
the iteration limit (J) is a maximum number of times that a single node can relay the message,
the network iteration limit (N) is a maximum number of relay occurrences in a continuous series of relaying of the message amongst a plurality of nodes; and a processor circuit that selectively relays the message with an updated iteration count (i), the iteration limit (J), the network iteration limit (N), the destination address, and the content portion, wherein the processor circuit selectively relays the message to:

(a) process the message if the destination address matches an address for the WCD, if not, then perform (b);

(b) set a temporary variable ($J_{int}$) to indicate a number times that the message can be relayed by the WCD equivalent to the iteration limit (J);

(c) determine whether the iteration count (i) reached the network iteration limit (N), and if yes, then ignore the message, if no, then perform (d);

(d) determine whether $J_{int}$ indicates that the WCD does not have any remaining times for relaying the message, if yes, then ignore the message, if no, then adjust $J_{int}$ to indicate one additional relaying of the message and update i to indicate one additional relaying of the message and perform (e);

(e) transmit the message from the WCD that includes the updated i, the J, the N, the destination address, and the content portion; and (f) repeat (c) through (e); and a transmitter circuit that transmits the selectively relayed message.

35. The WCD of claim 34, wherein the transmitter circuit provides an orthogonal frequency division multiplex (OFDM) signal as the transmitted signal.

36. The WCD of claim 34, wherein the parameters further comprise a message identification code (ID) that identifies the message, wherein the processor circuit compares the message identification code (ID) against a stored list of message identification codes for messages that the WCD has relayed, the processor circuit does not relay the message if the message identification code (ID) matches a message identification code in the stored list.

37. A wireless communication device (WCD), comprising:
a receiver and transmitter, each coupled to an antenna;
a buffer memory coupled to both the receiver and the transmitter;
a computational resource coupled to the buffer memory;
a first memory, suitable for storing data and software program instructions, coupled to the computational resource; and wherein the receiver receives a message comprising parameters including at least an iteration count (i), an iteration limit (J), a network iteration limit (N), a destination address, and a content portion, wherein:
the iteration count (i) is updated at each occurrence of a relaying of the message,
the iteration limit (J) is a maximum number of times that a single node can relay the message,
the network iteration limit (N) is a maximum number of relay occurrences in a continuous series of relaying of the message amongst a plurality of nodes; and wherein the computational resource selectively relays the message via the transmitter with an updated iteration count (i), the iteration limit (J), the network iteration limit (N), the destination address, and the content portion, wherein, to selectively relay the message, the computational resource:

(a) processes the message if the destination address matches an address for the WCD, if not, then performs (b);

(b) sets a temporary variable ($J_{int}$) to indicate a number times that the message is relayable by the WCD equivalent to the iteration limit (J);

(c) determines whether the iteration count (i) reached the network iteration limit (N), and if yes, then ignores the message, if no, then performs (d);

(d) determines whether $J_{int}$ indicates that the WCD does not have any remaining times for relaying the message, if yes, then ignores the message, if no, then adjusts $J_{int}$ to indicate one additional relaying of the message and updates i to indicate one additional relaying of the message and performs (e);
(e) transmits the message from the WCD that includes the updated i, the J, the N, the destination address, and the content portion; and
(f) repeating (c) through (e).

38. The WCD of claim 37, wherein:
the computational resource further determines a sector location of the message; and
wherein, to selectively relay the message, the computational resource relays the message to the sector location, wherein the sector location includes a quiet zone, wherein nodes in the sector location are added to the quiet zone based on message error rate for each node indicating the node is near the boundary of the sector, nodes in the quiet zone employ quasi-static zone based routing to relay the message to the destination address, nodes of the sector location that are not in the quiet zone employ blind diffusion to relay the message.

39. The WCD of claim 37, wherein the buffer memory comprises a portion of the first memory.

40. The WCD of claim 37, wherein the receiver is adapted to receive orthogonal frequency division multiplexed signals.

41. The WCD of claim 37, wherein the parameters further comprise a message identification code (ID) that identifies the message, wherein the computational resource compares the message identification code (ID) against a stored list of message identification codes for messages that the WCD has relayed, the computational resource does not relay the message if the message identification code (ID) matches a message identification code in the stored list.

42. The WCD of claim 37, wherein the parameters further comprise a zone (Z) that indicates the zone in which a device that is the intended recipient of the message having the destination address is located, the zone is one of a plurality of zones, the transmitter employs at least one sectorized antenna to relay the message to the zone, the first memory further storing a list of zones associated with the WCD.

43. The WCD of claim 37, wherein the message parameters further comprise a plurality of data rate control parameters that indicate at least two distinct data transmission rates, one for each of two different iteration count (i) values, wherein the message is relayed at the indicated data transmission rate for the corresponding iteration count (i) value.

* * * * *